United States Patent
Born et al.

(10) Patent No.: US 11,747,528 B2
(45) Date of Patent: Sep. 5, 2023

(54) DIFFRACTION GRATING DEVICE, METHOD OF MANUFACTURING THE SAME, AND OPTICAL APPARATUS INCLUDING THE DIFFRACTION GRATING DEVICE

(71) Applicants: SAMSUNG ELECTRONICS CO., LTD., Suwon-si (KR); The Board of Trustees of the Leland Stanford Junior University, Stanford, CA (US)

(72) Inventors: Brandon Born, Stanford, CA (US); Mark L. Brongersma, Stanford, CA (US); Sunghoon Lee, Seoul (KR)

(73) Assignees: SAMSUNG ELECTRONICS CO., LTD., Suwon-si (KR); The Board of Trustees of the Leland Stanford Junior University, Stanford, CA (US)

(\*) Notice: Subject to any disclaimer, the term of this patent is extended or adjusted under 35 U.S.C. 154(b) by 624 days.

(21) Appl. No.: 16/557,421

(22) Filed: Aug. 30, 2019

(65) Prior Publication Data
US 2020/0073031 A1     Mar. 5, 2020

Related U.S. Application Data

(60) Provisional application No. 62/725,868, filed on Aug. 31, 2018.

(30) Foreign Application Priority Data

Nov. 15, 2018 (KR) .................... 10-2018-0141133

(51) Int. Cl.
*G02B 5/18* (2006.01)
*G02B 27/42* (2006.01)
(Continued)

(52) U.S. Cl.
CPC ......... *G02B 5/1847* (2013.01); *G02B 5/1819* (2013.01); *G02B 5/1861* (2013.01);
(Continued)

(58) Field of Classification Search
CPC ...... G02B 5/0825–0841; G02B 5/1814; G02B 5/1819; G02B 5/1823; G02B 5/1861;
(Continued)

(56) References Cited

U.S. PATENT DOCUMENTS 4,828,356 A * 5/1989 Hobrock ............. G02B 5/1861
                                          359/629
6,219,478 B1 * 4/2001 Parriaux ............. G02B 5/1861
                                          385/37

(Continued)

FOREIGN PATENT DOCUMENTS

JP     5-249413 A     9/1993
JP   2002-341125 A   11/2002
(Continued)

OTHER PUBLICATIONS

Young, "Experimental demonstration of the general law of the interference of light," The Bakerian Lecture, Experiments and Calculations relative to physical optics, Nov. 24, 1803. (Year: 1803).*

(Continued)

*Primary Examiner* — Nicholas R. Pasko
(74) *Attorney, Agent, or Firm* — Sughrue Mion, PLLC

(57) ABSTRACT

Provided are a diffraction grating device, a method of manufacturing the diffraction grating device, and an optical apparatus including the diffraction grating device. The diffraction grating device includes a diffraction grating arranged on a light reflection substrate. The diffraction grating includes a plurality of diffraction elements, each diffraction element from among the plurality of diffraction (Continued)

elements having a height that causes a destructive interference between first light rays reflected by a top surface therefore and second light rays reflected by a bottom surface thereof, the first and second light rays being incident on the top and bottom surfaces, respectively, at an incidence angle greater than 45°.

32 Claims, 13 Drawing Sheets

(51) Int. Cl.
  *G02B 5/26* (2006.01)
  *G02B 27/01* (2006.01)
  *G02B 27/00* (2006.01)
  *G02B 6/293* (2006.01)

(52) U.S. Cl.
  CPC ....... *G02B 5/1866* (2013.01); *G02B 27/0081* (2013.01); *G02B 27/0101* (2013.01); *G02B 27/4272* (2013.01); *G02B 5/26* (2013.01); *G02B 6/29308* (2013.01)

(58) Field of Classification Search
  CPC .... G02B 5/1866; G02B 5/1871; G02B 5/285; G02B 5/287; G02B 5/288; G02B 5/3058; G02B 27/0905; G02B 27/4272
  See application file for complete search history.

(56) References Cited

U.S. PATENT DOCUMENTS

| | | | | |
|---|---|---|---|---|
| 6,680,799 B1* | 1/2004 | Parriaux | ............... | H01S 3/0604 359/569 |
| 6,754,006 B2* | 6/2004 | Barton | ................. | G02B 5/1857 359/569 |
| 7,304,781 B2* | 12/2007 | Chang-Hasnain | ... | G02B 5/0816 359/260 |
| 7,800,823 B2* | 9/2010 | Perkins | .............. | G02B 27/4261 359/485.05 |
| 8,081,318 B2* | 12/2011 | Sternberg | .............. | G01J 3/4531 356/521 |
| 8,116,002 B2* | 2/2012 | Hoose | .................. | G02B 5/1861 359/571 |
| 8,189,643 B2* | 5/2012 | Chang-Hasnain | ... | G02B 5/1861 372/50.1 |
| 8,755,118 B2* | 6/2014 | Chang-Hasnain | ... | G02B 5/1861 359/572 |
| 9,423,539 B2* | 8/2016 | Fattal | ....................... | G02B 5/08 |
| 2007/0098324 A1 | 5/2007 | Kitamura et al. | | |
| 2012/0300302 A1* | 11/2012 | Bonod | ................ | G02B 5/1861 359/569 |
| 2013/0100528 A1* | 4/2013 | Florentino | .......... | G02B 5/1809 359/571 |
| 2013/0301988 A1* | 11/2013 | Monmayrant | ......... | G02B 5/203 385/37 |
| 2015/0362641 A1* | 12/2015 | Boyraz | .................... | B23K 9/26 359/571 |
| 2016/0033784 A1 | 2/2016 | Levola et al. | | |

FOREIGN PATENT DOCUMENTS

| | | |
|---|---|---|
| JP | 2007-121899 A | 5/2007 |
| KR | 10-1748738 B1 | 6/2017 |
| WO | WO-2006117244 A1 * 11/2006 ........... G02B 5/1861 |

OTHER PUBLICATIONS

Perry et al., "High-efficiency multilayer dielectric diffraction gratings," Optics Letters, vol. 20, No. 8, Apr. 15, 1995. (Year: 1995).*

Lyndin et al., "Design and fabrication of an all-dielectric grating with top-hat high diffraction efficiency over a broad spectral range," Journal of the European Optical Society, Rapid Publications 2, 07019. (Year: 2007).*

Ferhanoglu et al., "Lamellar grating optimization for miniaturized fourier transform spectrometers," Optics Express, vol. 12, No. 23, 21289-21301, Nov. 6, 2009. (Year: 2009).*

* cited by examiner

DIFFRACTION GRATING DEVICE, METHOD OF MANUFACTURING THE SAME, AND OPTICAL APPARATUS INCLUDING THE DIFFRACTION GRATING DEVICE

CROSS-REFERENCE TO RELATED APPLICATIONS

This application is based on and claims priority under 35 U.S.C. § 119 to U.S. Provisional Application No. 62/725,868, filed on Aug. 31, 2018, in the US Patent Office and Korean Patent Application No. 10-2018-0141133, filed on Nov. 15, 2018, in the Korean Intellectual Property Office, the disclosures of which are incorporated by reference herein in their entireties.

BACKGROUND

1. Field

Example embodiments of the present disclosure relate to diffraction elements, and more particularly, to diffraction grating devices and methods of manufacturing the diffraction grating devices and optical apparatuses including the diffraction grating devices.

2. Description of the Related Art

A diffraction grating may be an optical device that periodically changes an amplitude and a phase of light. The diffraction grating performs a spectral function like a prism. Therefore, a spectrum of light may be obtained by using a diffraction grating.

A diffraction grating has a structure for providing a periodic change to an amplitude and phase of light, and may have a structure in which diffraction holes, obstacles, or parallel thin lines are periodically engraved on, for example, a flat surface, a concave glass, a metal plate, etc. In other words, the diffraction holes, obstacles, or parallel thin lines may be provided in a repeating pattern in one or more directions on the flat surface, concave glass, metal plate, etc.

A diffraction grating may be classified into a transmissive diffraction grating and a reflection type diffraction grating. The transmissive diffraction grating has a structure in which slits are arranged at a constant interval on a transparent substrate. The reflection type diffraction grating has a structure in which lines are densely engraved at a constant interval on a non-transparent substrate like a reflection mirror.

SUMMARY

Example embodiments provide diffraction grating devices configured to increase diffraction efficiency with respect to incident light.

Example embodiments provide diffraction grating devices that ensure a wide view and have a reduced volume.

Example embodiments provide optical apparatuses configured to reduce chromatic dispersion by including the diffraction grating devices.

Example embodiments provide methods of manufacturing the diffraction grating devices that may readily realize a large area diffraction grating device and may reduce production cost.

Additional aspects will be set forth in part in the description which follows and, in part, will be apparent from the description, or may be learned by practice of the presented embodiments.

In accordance with an aspect of the disclosure, a diffraction grating device includes a light reflection substrate; and a diffraction grating arranged on the light reflection substrate, wherein the diffraction grating comprises a plurality of diffraction elements, each diffraction element from among the plurality of diffraction elements having a height that causes a destructive interference between first light rays reflected by a top surface thereof and second light rays reflected by a bottom surface thereof, the first and second light rays being incident on the top and bottom surfaces, respectively, at an incidence angle greater than 45°.

The diffraction grating device may further include a dielectric layer between the light reflection substrate and the diffraction grating, wherein a thickness of the dielectric layer is an integer multiple of a wavelength of light incident on the diffraction grating.

The light reflection substrate may be a Bragg reflector comprising dielectrics having refractive indexes different from one another.

A refractive index of the diffraction grating may be in a range from 1.3 to 2.0.

Each diffraction element from among the plurality of diffraction elements may include a main diffraction element and an auxiliary diffraction element.

All diffraction elements from among the plurality of diffraction elements may be arranged to have positive grating angles or all diffraction elements from among the plurality of diffraction elements may be arranged to have negative grating angles.

A first diffraction element from among the plurality of diffraction elements may be arranged to have a positive grating angle and a second diffraction element from among the plurality of diffraction elements may be arranged to have a negative grating angle.

Each diffraction element from among the plurality of diffraction elements may include a main diffraction element and a plurality of auxiliary diffraction elements, wherein widths of the plurality of auxiliary diffraction elements are different from one another.

The dielectric layer may be a mono-layer.

The dielectric layer may include stacked first and second dielectric layers, wherein respective refractive indices of the stacked first and second dielectric layers are different from each other.

The light reflection substrate may include a metal substrate.

The light reflection substrate may include a reflective wire grid polarizer.

A width of the main diffraction element may be greater than a width of the auxiliary diffraction element.

The auxiliary diffraction element may include a plurality of auxiliary diffraction elements that are separated from one another.

All auxiliary diffraction elements from among the plurality of auxiliary diffraction elements may be arranged to have positive grating angles.

All auxiliary diffraction elements from among the plurality of auxiliary diffraction elements may be arranged to have negative grating angles.

Pitches between adjacent diffraction elements from among the plurality of diffraction elements may be equal to one another.

The plurality of diffraction elements may include diffraction elements having positive grating angles and diffraction elements having negative grating angles.

A refractive index of the dielectric layer may be equal to or greater than a refractive index of the plurality of diffraction elements.

Of the first and second dielectric layers, a refractive index of the dielectric layer that directly contacts the plurality of diffraction elements may be greater than a refractive index of the diffraction elements, and of the first and second dielectric layers, the refractive index of the dielectric layer that directly contacts the plurality of diffraction elements may be greater than a refractive index of the other dielectric layer of the first and second dielectric layers.

The plurality of diffraction elements having positive grating angles may be arranged to have different grating angles from one another.

The plurality of diffraction elements having negative grating angles may be arranged to have different grating angles from one another.

Pitches of the plurality of diffraction elements having the positive grating angles may be different from one another.

Pitches of the plurality of diffraction elements having the negative grating angles may be different from one another.

In accordance with an aspect of the disclosure, an optical apparatus includes a light source unit; and a first diffraction grating device configured to diffract light incident from the light source unit, wherein the first diffraction grating device is a diffraction grating device in accordance with the above-described aspect of the disclosure.

The light source unit may include a light source configured to emit light; and a second diffraction grating device, wherein the light emitted by the light source is incident on the second diffraction grating device, and wherein the second diffraction grating device is configured to provide incident light to the first diffraction grating device by diffracting light incident from the light source.

The first diffraction grating device and the second diffraction grating device may have grating angles identical to one another.

The first diffraction grating device and the second diffraction grating device may have grating angles different from one another.

The light source unit may include a light source configured to directly emit light; a second diffraction grating device that diffracts light incident from the light source such that light exits the second diffraction grating device in a first direction; and a transmission element that transmits the light exiting the second diffraction grating device to the first diffraction grating device.

One of the first and second diffraction grating devices may be slantingly arranged at an angle less than 45° with respect to a normal line perpendicular to a diffraction surface of the other one of the first and second diffraction grating devices.

The first diffraction grating device may include a first beam expander and the second diffraction grating device may include a second beam expander.

The first diffraction grating device may include a lens, and the second diffraction grating device may include a beam expander.

The transmission element may be a light reflector.

In accordance with an aspect of the disclosure, a method of manufacturing a diffraction grating device includes forming a dielectric layer on a light reflection substrate; and forming a plurality of diffraction elements that constitute a diffraction grating on the light reflection substrate by patterning the dielectric layer, wherein the dielectric layer has a refractive index less than 2.0.

The patterning of the dielectric layer may include aligning a template on the dielectric layer, wherein a diffraction element pattern corresponding to the plurality of diffraction elements is engraved on a surface of the template; imprinting the template onto the dielectric layer in a state in which the template and the dielectric layer are aligned; and removing the template.

Each diffraction element from among the plurality of diffraction elements may have a height that generates a destructive interference between first light rays reflected by a top surface and second light rays reflected by a bottom surface of the diffraction element, the first and second light rays being incident onto the top and bottom surfaces, respectively, at an incidence angle greater than 75°.

The method may further include placing a spacer layer between the light reflection substrate and the dielectric layer.

Each diffraction element from among the plurality of diffraction elements may include a main diffraction element and an auxiliary diffraction element.

All of the plurality of diffraction elements may be formed to have pitches equal to one another.

All of the plurality of diffraction elements may be formed to have pitches different from one another.

Some diffraction elements from among the plurality of diffraction elements may include a main diffraction element and an auxiliary diffraction element, and remaining diffraction elements from among the plurality of diffraction elements may include only the main diffraction element.

The auxiliary diffraction element may include a plurality of auxiliary diffraction elements, wherein widths of the plurality of auxiliary diffraction elements are different from one another.

BRIEF DESCRIPTION OF THE DRAWINGS

The above and other aspects will become apparent and more readily appreciated from the following description of example embodiments, taken in conjunction with the accompanying drawings, in which.

DETAILED DESCRIPTION

Figure 1:
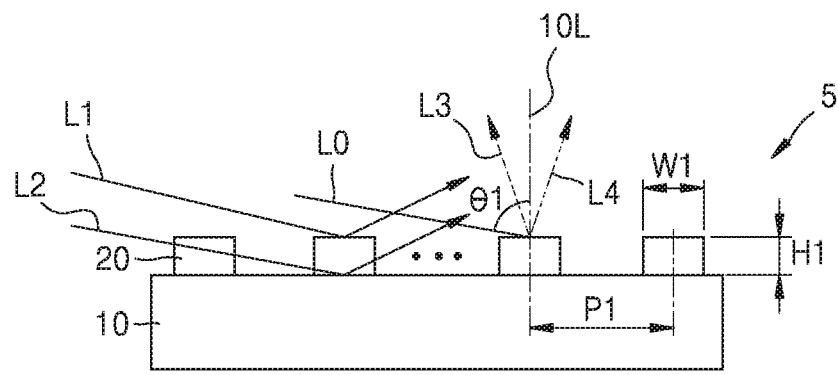
FIG. 1 is a cross-sectional view of a diffraction grating device according to an example embodiment.

Diffraction grating devices, methods of manufacturing the diffraction grating devices, and optical apparatuses according to example embodiments will now be described with reference to the accompanying drawings. In the drawings, thicknesses of layers and regions are exaggerated for clarity of the specification.

FIG. 1 is a cross-sectional view of a diffraction grating device 5 according to an embodiment.

Referring to FIG. 1, the diffraction grating device 5 according to an embodiment includes a substrate 10 and a plurality of diffraction elements 20 arranged on the substrate 10. The substrate 10 may be a material layer (i.e., a light reflection substrate) that reflects incident light. As an example, the substrate 10 may be a metal mirror, a substrate that has a light reflection characteristic by including a metal, or a metal substrate. In another embodiment, a reflective wire grid polarizer (WGP) may be used as the substrate 10. All of the plurality of diffraction elements 20 may be referred to as a diffraction grating. The diffraction elements 20 may be arranged on a surface of the substrate 10. For example, the diffraction elements 20 may be arranged on an upper surface (i.e., a top surface) of the substrate 10. The diffraction elements 20 are separated from each other. As shown in FIG. 1, the diffraction elements 20 may be distributed with a given pitch P1 from each other on the substrate 10. The diffraction elements 20 may have a given height H1 and a given width W1. When the dimensions of the diffraction elements 20 are changed, diffraction characteristics of the diffraction elements 20 may be changed. The refractive index of the diffraction elements 20 may be 2.0 or less, and, as an example, the refractive index of the diffraction elements 20 may be in a range from about 1.35 to about 2.0 for a high efficiency operation and a small aspect ratio. The diffraction elements 20 may include a low loss dielectric material, such as polymer or $SiO_2$. Here, low loss denotes a low absorption loss of incident light. That is, the absorption loss of the diffraction elements 20 with respect to incident light is low.

The height H1 of the diffraction elements 20 may be determined in connection with a wavelength of incident light. In this way, the height H1 may be selected so that zeroth-order diffraction light may be removed through destructive interference. For example, a path difference may occur between light L1 reflected by upper surfaces of the diffraction elements 20 and light L2 reflected by bottom surfaces of the diffraction elements 20, and thus, the height H1 of the diffraction elements 20 may be set so that the path difference satisfies conditions for occurrence of destructive interference. The height characteristic may be a factor of increasing diffraction efficiency. The diffraction elements 20 may be arranged to have a given fill factor. The fill factor is defined as a diffraction grating coverage on a single period P1. As an example, the fill factor of the diffraction elements 20 may be set so that a percentage of light reflected by the upper surfaces of the diffraction elements 20 is equal to a percentage of light reflected by the bottom surfaces of the diffraction elements 20. At this point, the absorption loss of light is excluded. The fill factor may be set according to incident light, light absorption ratio, or refractive index of the diffraction elements 20. The lower the refractive index of the diffraction elements 20, the greater fill factor may be required.

A diffraction characteristic (i.e., a grating angle) of the diffraction grating device 5 may vary according to the pitch P1 of the diffraction elements 20. The diffraction grating device 5 may have a positive diffraction characteristic or a negative diffraction characteristic according to the pitch P1 of the diffraction elements 20. In the diffraction elements 20, when incident light L0 is diffracted towards a light source that emits the incident light L0, it may be said that the diffraction grating device 5 shows or has a positive diffraction characteristic. As shown in FIG. 1, a diffraction light L3 has a positive output angle. In other words, in FIG. 1, when the incident light L0 that enters the diffraction elements 20 exits as diffraction light L3 that is diffracted on a left side of a reference line 10L which is perpendicular to an upper surface of the substrate 10, it may be said that the diffraction grating device 5 has a positive diffraction characteristic or it may be said that the diffraction elements 20 have a positive diffraction characteristic. On the other hand, when the incident light L0 is diffracted in a direction opposite to the light source, that is, when the incident light L0 exits as diffraction light L4 that is diffracted on a right side of the reference line 10L, it may be said that the diffraction grating device 5 has a negative diffraction characteristic or that the diffraction elements 20 have a negative diffraction characteristic. In this case, the diffraction light L4 has a negative output angle. When all of the diffraction elements 20 arranged on the substrate 10 have a geometrically identical shape and the pitches P1 between the diffraction elements 20 are identical, the whole of the diffraction grating device 5 may have a positive diffraction characteristic or a negative diffraction characteristic according to the pitches P1.

Although it will be described below, when pitches of some of the diffraction elements 20 are different from those of remaining diffraction elements 20, the diffraction grating device 5 may have diffraction characteristics different from one another according to regions. For example, two diffraction elements on a left side of the diffraction elements 20 may be arranged to have a pitch showing a negative diffraction characteristic, and two diffraction elements on a right side of the diffraction elements 20 may be arranged to have a pitch showing a positive diffraction characteristic. As a result, the diffraction grating device 5 may be used as various optical elements (for example, a light expander, a lens, etc.) according to the diffraction characteristics of the diffraction elements 20.

In the diffraction grating device 5, an incidence angle θ1 of the incident light L0 with respect to a surface normal reference line 10L entering the diffraction elements 20 may be greater than 45°. As an example, a range of the incidence angle θ1 may be 75°≤θ1<90°. In this way, since the diffraction grating device 5 has a relatively greater incidence angle θ1 than 45° and may obtain diffraction light of a relatively wide range, an ultra-small diffraction grating device may be realized.

Figure 2:
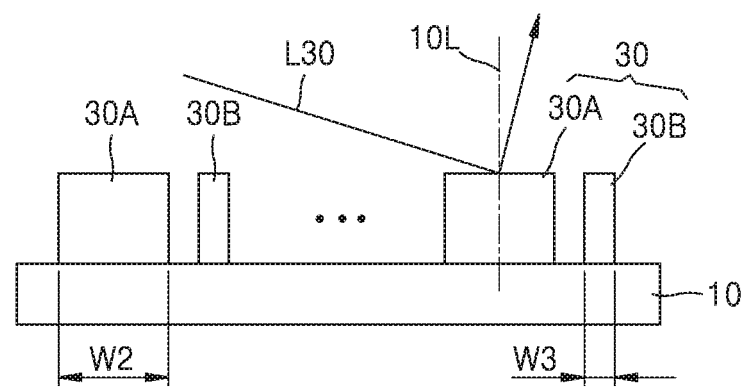
FIG. 2 is a cross-sectional view of a diffraction grating device according to an example embodiment.
Figure 3:
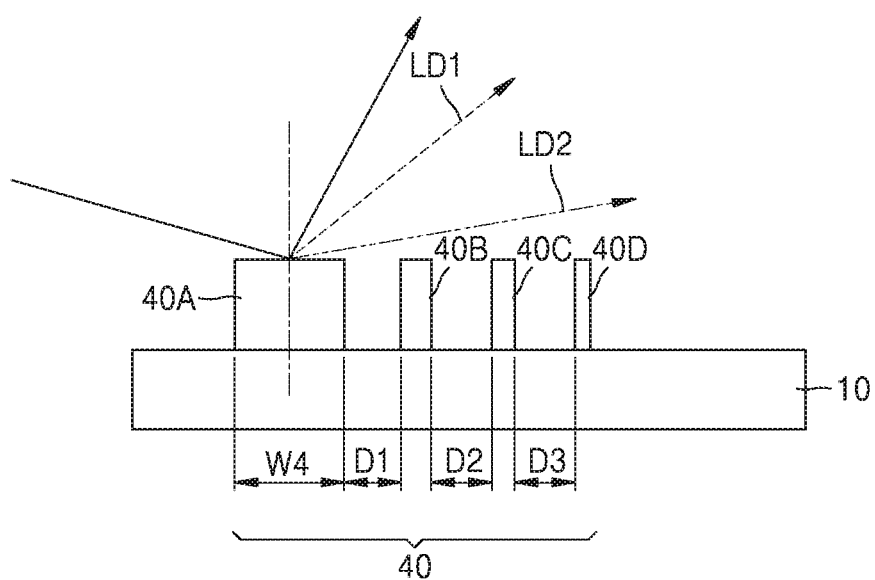
FIG. 3 is a cross-sectional view of a diffraction grating device according to an example embodiment.

In another embodiment, the diffraction elements 20 of the diffraction grating device 5 may be replaced by second diffraction elements 30 of FIG. 2 or a third diffraction element 40 of FIG. 3. All of the diffraction elements 20 may be replaced by the second diffraction elements 30 of FIG. 2 or the third diffraction element 40 of FIG. 3. In another embodiment, only some of the diffraction elements 20 may be replaced by the second diffraction elements 30 or the third diffraction element 40. In this case, the diffraction grating device 5 may simultaneously have two diffraction characteristics.

Referring to FIG. 2, the second diffraction elements 30 formed on the substrate 10 may include main diffraction elements 30A and auxiliary diffraction elements 30B. The main diffraction elements 30A and the auxiliary diffraction elements 30B are separated from each other and do not contact each other. A height of the main diffraction elements 30A and a height of the auxiliary diffraction elements 30B may be equal to each other. A width W2 of the main diffraction elements 30A is greater than a width W3 of the auxiliary diffraction elements 30B. The second diffraction elements 30 may be arranged to have a pitch showing a negative diffraction characteristic. Accordingly, light L30 incident to the second diffraction elements 30 is diffracted in a right side direction of the reference line 10L. One method of increasing diffraction efficiency is removing a high-order component (for example, diffraction light of greater than second order) from diffraction light, and for this purpose, the auxiliary diffraction elements 30B are provided. Due to the existence of the auxiliary diffraction elements 30B, a diffraction component that may generate a destructive interference with a phase of a high-order component is generated. Accordingly, a high-order diffraction component that is not desired and is included in diffraction light may be removed. Considering the removal of the high-order component, the width W3 of the auxiliary diffraction elements 30B and a gap between the main diffraction elements 30A and the auxiliary diffraction elements 30B may be set. When the auxiliary diffraction elements 30B are included in the diffraction grating device, a diffraction efficiency close to 1 may be obtained.

A plurality of auxiliary diffraction elements 30B may be provided with respect to a single main diffraction element 30A as shown in FIG. 3.

Referring to FIG. 3, the third diffraction element 40 formed on the substrate 10 may include a main diffraction element 40A and first through third auxiliary diffraction elements 40B, 40C, and 40D. Two or three auxiliary diffraction elements may be provided with respect to a single main diffraction element. Since the auxiliary diffraction elements are included, a wide diffraction angle and a high diffraction efficiency may be obtained in the case when light enters sides of the diffraction grating device at a large angle, that is, the light enters sides of the diffraction grating device at an inclined angle. Also, a range of diffraction angles for obtaining a high diffraction efficiency in proportion to a number of the auxiliary diffraction elements may be increased.

A height of the main diffraction element 40A may be equal to that of the first through third auxiliary diffraction elements 40B, 40C, and 40D. The height of the first through third auxiliary diffraction elements 40B, 40C, and 40D may be equal to each other. A width W4 of the main diffraction element 40A is greater than that of the first through third auxiliary diffraction elements 40B, 40C, and 40D. The main diffraction element 40A and the first through third auxiliary diffraction elements 40B, 40C, and 40D are separated from each other, and do not contact each other. The first through third auxiliary diffraction elements 40B, 40C, and 40D are separated from each other and do not contact each other. As shown in FIG. 3, A gap D1 between the main diffraction element 40A and the first auxiliary diffraction element 40B may be equal to or different from gaps D2 and D3 between the first through third auxiliary diffraction elements 40B, 40C, and 40D.

When the gaps D1, D2, and D3 are different from one another, the gap D1 between the main diffraction element 40A and the first auxiliary diffraction element 40B may be greater or less than the gaps D2 and D3 between the first through third auxiliary diffraction elements 40B, 40C, and 40D, and the gaps D2 and D3 between the first through third auxiliary diffraction elements 40B, 40C, and 40D may be increased or decreased away from the main diffraction element 40A.

For convenience, it is depicted that the widths of the first through third auxiliary diffraction elements 40B, 40C, and 40D are equal, but the widths of the first through third auxiliary diffraction elements 40B, 40C, and 40D may be different from one another. For example, the first through third auxiliary diffraction elements 40B, 40C, and 40D may be arranged in a direction in which the width is gradually increased or decreased away from the main diffraction element 40A.

Dimensions (height, width, gap, etc.) of the main diffraction element 40A and the first through third auxiliary diffraction elements 40B, 40C, and 40D may be controlled in a process of manufacturing the diffraction grating device 5 according to the desired diffraction characteristics. When the number of the auxiliary diffraction elements increases, the effect of destructive interference with respect to high-order components LD1 and LD2 of the diffraction light may be increased. As a result, due to the existence of the auxiliary diffraction elements in the diffraction grating device, a diffraction efficiency of close to 1 may be obtained. That is, of components included in the diffraction light, light of a specific component (order), for example, only first order diffraction light may be obtained. The diffraction grating device 5 according to an embodiment may be applied to various apparatuses due to the above characteristic. For example, the diffraction grating device 5 may be applied to a beam expander and may be used in augmented reality, virtual reality, or an optical combiner for a light field display system.

Figure 4:
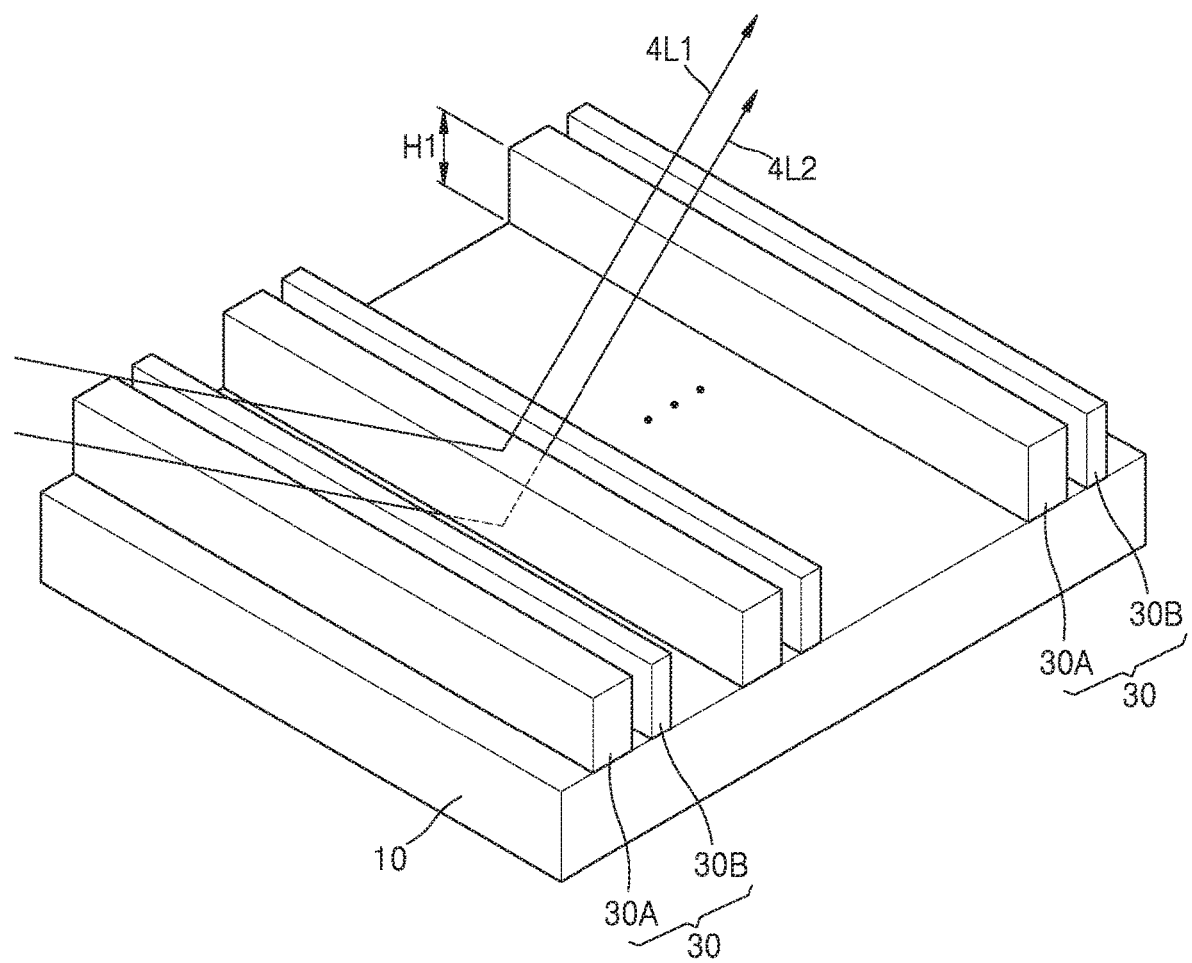
FIG. 4 is a perspective view of the diffraction grating device of FIG. 2.

FIG. 4 is a perspective view of the diffraction grating device having the second diffraction elements 30 of FIG. 2.

Referring to FIG. 4, the second diffraction elements 30 are separated from each other and arranged parallel to each other on the substrate 10. Also, the main diffraction elements 30A and the auxiliary diffraction elements 30B of each of the second diffraction elements 30 are arranged parallel to each other and separated from each other. The diffraction elements 20 of FIG. 1 or the third diffraction element 40 of FIG.

3 may also be arranged on the substrate 10 in a manner similar to the second diffraction elements 30.

In FIG. 4, reference numeral 4L1 indicates light reflected by an upper surface of the main diffraction elements 30A, and reference numeral 4L2 indicates light reflected by a bottom surface of the main diffraction elements 30A. The reflected light rays 4L1 and 4L2 correspond to zeroth-order diffraction rays. Since the main diffraction elements 30A have a height H1 set such that a path difference between the reflected light rays 4L1 and 4L2 is half of a wavelength of incident light, the reflected light rays 4L1 and 4L2 may destructively interfere with one another. That is, due to the height condition of the main diffraction elements 30A, the zeroth-order diffraction light may be removed through destructive interference.

Figure 5:
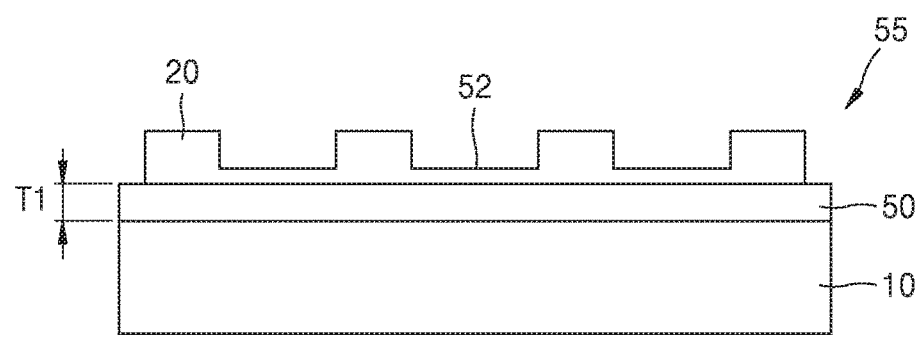
FIG. 5 is a cross-sectional view of a diffraction grating device according to an example embodiment.

FIG. 5 is a cross-sectional view of a diffraction grating device 55 according to another embodiment.

Referring to FIG. 5, the diffraction grating device 55 includes a substrate 10, a first spacer 50, and a plurality of diffraction elements 20. The first spacer 50 may be a spacing material layer. The second diffraction elements 30 of FIG. 2 or the third diffraction element 40 of FIG. 3 may be arranged instead of the diffraction elements 20. The first spacer 50 may be arranged between the substrate 10 and the diffraction elements 20. The first spacer 50 may be arranged on a surface of the substrate 10, for example, on an upper surface of the substrate 10. The first spacer 50 may cover the whole upper surface of the substrate 10. The first spacer 50 may have a thickness T1 that is an integer multiple of a wavelength of incident light. The thickness T1 of the first spacer 50 may be determined in consideration of an incidence angle of light, a diffraction angle, a refractive index of the first spacer 50, a refractive index of the diffraction elements 20, etc. The first spacer 50 may be a material layer including a low loss material having low light absorption with respect to incident light. For example, the first spacer 50 may be a dielectric layer having a refractive index less than that of the diffraction elements 20. Accordingly, when light enters the diffraction grating device 55, the light absorption loss by the first spacer 50 may be negligible.

The diffraction grating devices described here may be manufactured in various ways, and one of the methods is a nano-imprint method, which will be described below.

In consideration of manufacturing methods, the first spacer 50 may be a material layer including the same material as the diffraction elements 20. The first spacer 50 may be a monolayer. The diffraction elements 20 are separately arranged from each other on the first spacer 50. The diffraction elements 20 may be arranged with a constant pitch on an upper surface of the first spacer 50. In an embodiment, a pitch of some of the diffraction elements 20 may be different from a pitch of the remaining diffraction elements 20. In other words, the diffraction elements 20 may be arranged to show a positive diffraction characteristic, a negative diffraction characteristic, or both negative and positive diffraction characteristics. A residue material layer 52 may be present on the first spacer 50 between the diffraction elements 20. The residue material layer 52 may be located on a lower side of the diffraction elements 20, and may cover the whole upper surface of the first spacer 50. The residue material layer 52 may remain on the lower side of the diffraction elements 20 in a process of manufacturing the diffraction grating device 55 and may have a thickness less than 30 nm, for example, 20 nm or less. The thickness of the residue material layer 52 may be reduced less than 20 nm according to process conditions of the manufacturing process or the process conditions may be controlled so as not to form the residue material layer 52. In this way, since the thickness of the residue material layer 52 is very small, the residue material layer 52 may have a negligible effect on diffraction of the incident light. The residue material layer 52 is a material layer including the same material as the diffraction elements 20.

Figure 6:
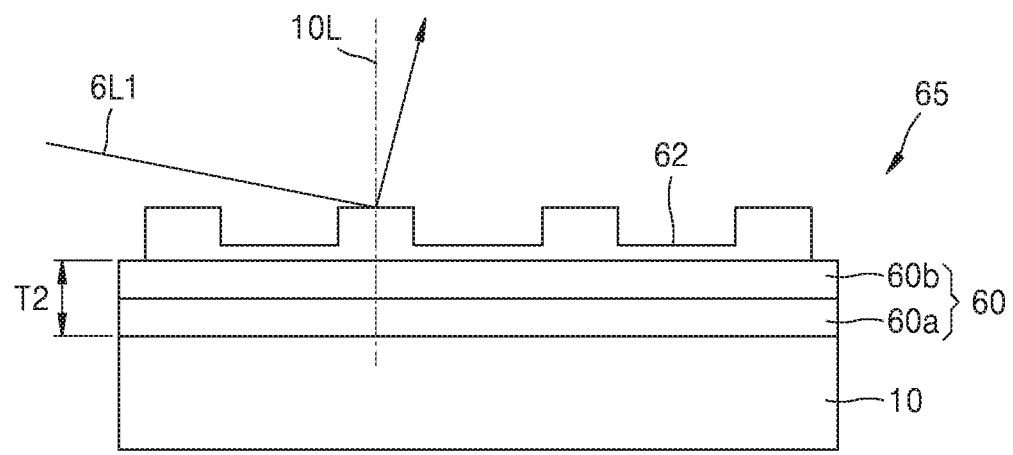
FIG. 6 is a cross-sectional view of a diffraction grating device according to an example embodiment.

FIG. 6 is a cross-sectional view of a diffraction grating device 65 according to an embodiment. The diffraction grating device 65 of FIG. 6 is similar to the diffraction grating device 55 of FIG. 5 in terms of configuration. Accordingly, in describing the diffraction grating device 65, differences from the diffraction grating device 55 of FIG. 5 will be mainly described.

Referring to FIG. 6, a second spacer 60 may be present between the substrate 10 and the diffraction elements 20. The second spacer 60 may directly contact the substrate 10 and the diffraction elements 20. The second spacer 60 may be formed on a surface, for example, an upper surface of the substrate 10 and may cover a whole upper surface of the substrate 10. The diffraction elements 20 are located on the second spacer 60. The second spacer 60 may include a first dielectric layer 60a and a second dielectric layer 60b that are sequentially stacked in the order shown in FIG. 6, with the first dielectric layer 60a stacked below the second dielectric layer 60b. The first dielectric layer 60a is formed on the upper surface of the substrate 10. The second dielectric layer 60b is formed on the first dielectric layer 60a. The diffraction elements 20 are arranged on the second dielectric layer 60b and directly contact the second dielectric layer 60b. In the second spacer 60, the second dielectric layer 60b may have a refractive index greater than that of the diffraction elements 20. Also, the second dielectric layer 60b may have a refractive index greater than that of the first dielectric layer 60a. In this way, the refractive indices of the first dielectric layer 60a and the second dielectric layer 60b are different from one another, and thus, the second spacer 60 may function as a role of the Bragg Reflector.

The second spacer 60 may further include dielectric layers besides the first dielectric layer 60a and the second dielectric layer 60b. For example, the second spacer 60 may have a layer structure in which a plurality of unit layers are sequentially stacked using the first and second dielectric layers 60a and 60b as the unit layer. A thickness T2 of the second spacer 60 may be an integer multiple of a wavelength of light 6L1 that slantingly enters the diffraction grating device 65 with a large incidence angle. While satisfying the condition, a thickness of the first dielectric layer 60a and a thickness of the second dielectric layer 60b included in the second spacer 60 may be equal to or different from one another. When the degree of the light reflection loss by the substrate 10 is not negligible or when a small output angle is required, the first spacer 50 of FIG. 5 and the second spacer 60 of FIG. 6 may be helpful for increasing the diffraction efficiency. A residue material layer 62 may be present on the second dielectric layer 60b between the diffraction elements 20. The residue material layer 62 may be the same as the residue material layer 52 of FIG. 5.

When the second spacer 60 is used as a Bragg Reflector, the substrate 10 may be omitted or may be replaced by a transparent substrate such as glass.

Figure 7:
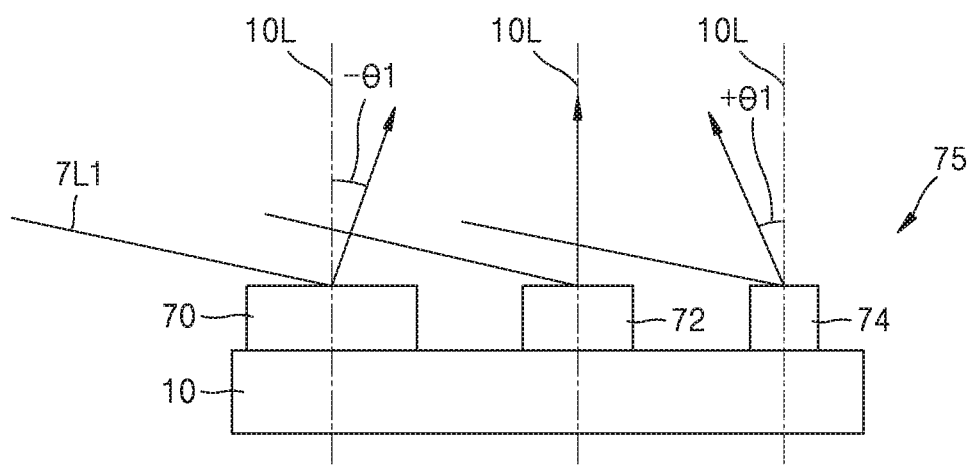
FIG. 7 is a cross-sectional view of a diffraction grating device according to an example embodiment.

FIG. 7 is a cross-sectional view of a diffraction grating device 75 according to another embodiment.

FIG. 7 shows a case in which a plurality of different diffraction elements, that is, first through third diffraction elements 70, 72, and 74 having different diffraction characteristics from one another are distributed on a substrate 10.

Referring to FIG. 7, the first through third diffraction elements 70, 72, and 74 are arranged on the substrate 10. The first diffraction element 70 diffracts incident light 7L1 in a direction on a right side of a reference line 10L with a given diffraction angle −θ1, and thus may be a diffraction element having a negative diffraction characteristic. The first diffraction element 70 may be one or more of the second diffraction elements 30 of FIG. 2, or the third diffraction element 40 of FIG. 3. The second diffraction element 72 diffracts the incident light 7L1 in a direction parallel to the reference line 10L, that is, in a direction perpendicular to an upper surface of the substrate 10 and may be a diffraction element having a positive diffraction characteristic. Here, a grating angle of 0° is defined as a positive diffraction characteristic. The second diffraction element 72 may be one or more of the diffraction elements 20 of FIG. 1 that do not have an auxiliary diffraction element. The third diffraction element 74 diffracts the incident light 7L1 in a direction on a left side of the reference line 10L with a given diffraction angle +θ1, and may thus be a diffraction element having a positive diffraction characteristic. The third diffraction element 74 may be one or more of the diffraction elements 20 of FIG. 1.

Since the diffraction characteristics of the first through third diffraction elements 70, 72, and 74 are different from one another, pitches of the first through third diffraction elements 70, 72, and 74 may be different from each other. Due to the different diffraction characteristics of the first through third diffraction elements 70, 72, and 74, the incident light 7L1 may, for example, converge to a given location. As a result, the diffraction grating device 75 of FIG. 7 may function as a lens or a mirror that focuses incident light on a focal point. When the diffraction characteristics of the first and third diffraction elements 70 and 74 are oppositely arranged, the diffraction grating device 75 may function as a lens or a mirror that diverges incident light. In this way, when diffraction elements having various diffraction characteristics are arranged on the substrate 10 with appropriate pitches, the diffraction grating device 75 may be used as an optical element like a lens or a mirror. In FIG. 7, a plurality of diffraction elements may further be arranged between the first through third diffraction elements 70, 72, and 74. At this point, the diffraction direction characteristics of the further arranged diffraction elements may be different from one another, and also, may be different from those of the first through third diffraction elements 70, 72, and 74.

As an example, in the case of the diffraction elements that are further arranged between the first and second diffraction elements 70 and 72, the diffraction elements may be arranged so that a negative diffraction characteristic is gradually reduced, that is, a negative grating angle (i.e., output angle) is gradually reduced away from the first diffraction element 70 towards the second diffraction element 72 by controlling pitches between diffraction elements. In the case of the diffraction elements that are further arranged between the second and third diffraction elements 72 and 74, the diffraction elements may be arranged so that a positive diffraction characteristic is gradually reduced, that is, a positive grating angle is gradually reduced away from the third diffraction element 74 towards the second diffraction element 72 by controlling pitches between diffraction elements.

FIGS. 8 through 11 are graphs showing results of simulations performed to investigate diffraction efficiencies according to the type of diffraction element of the diffraction grating devices according to the example embodiments described above. In the simulations, a maximum value of an aspect ratio of a main diffraction element was 3. In each drawing, a horizontal axis indicates an output angle, and a vertical axis indicates a diffraction efficiency.

Figure 8:
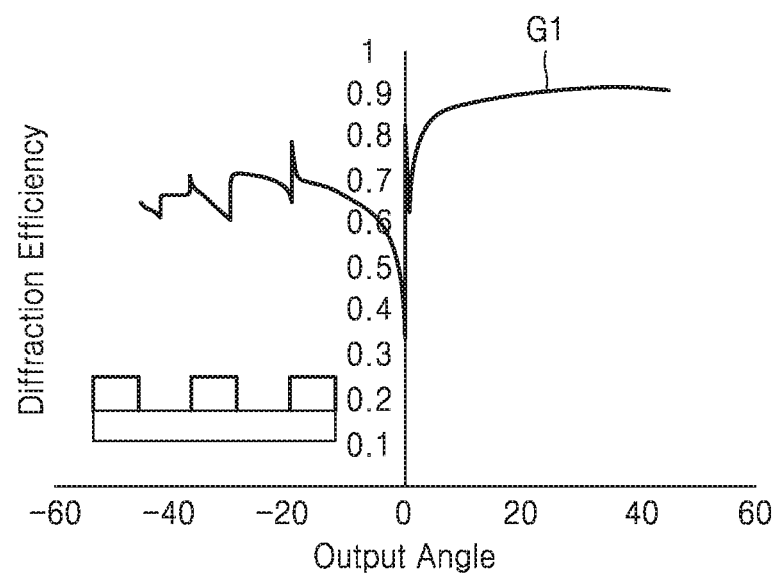
FIGS. 8 through 11 are graphs showing results of simulations performed to investigate diffraction efficiency according to the type of diffraction element of the diffraction grating devices according to example embodiments described above.

FIG. 8 shows a diffraction efficiency when a diffraction element does not include an auxiliary diffraction element, that is, the diffraction element includes only a main diffraction element.

Referring to FIG. 8, it is seen that, when the diffraction element includes only the main diffraction element, the diffraction efficiency is higher at a positive output angle than a negative output angle.

Figure 9:
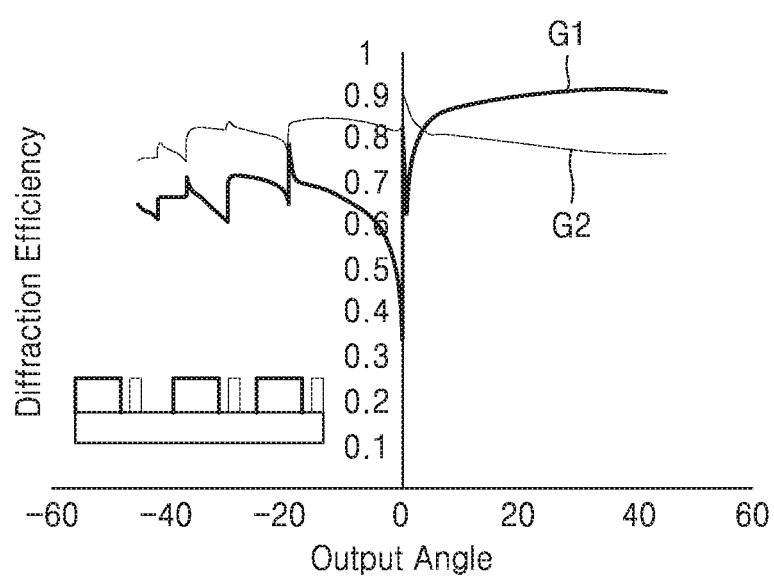

FIG. 9 shows a diffraction efficiency G1 when a diffraction element includes only a main diffraction element and a diffraction efficiency G2 when the diffraction element includes the main diffraction element and a single auxiliary diffraction element.

Referring to FIG. 9, it is seen that, when the diffraction element includes the main diffraction element together with a single auxiliary diffraction element, equal diffraction efficiencies are seen at a positive output angle and a negative output angle. This result indicates that when a diffraction element including a main diffraction element together with a single auxiliary diffraction element is used, positive diffraction light and negative diffraction light may be equally generated.

However, when the above case resulting in the diffraction efficiency G2 is compared to the case when the diffraction element includes only the main diffraction element resulting in the diffraction efficiency G1, it is seen that the diffraction efficiency of the diffraction element that includes only the main diffraction element is greater than that of the diffraction element that includes the main diffraction element and a single auxiliary diffraction element at the positive output angle.

However, it is seen that the diffraction efficiency of the diffraction element that includes the main diffraction element and a single auxiliary diffraction element is greater than that of the diffraction element that includes only the main diffraction element at a negative output angle. Accordingly, in order to generate diffraction light having a negative output angle, that is, diffraction light in a negative direction, a diffraction element including the main diffraction element and a single auxiliary diffraction element may be actively used.

Figure 10:
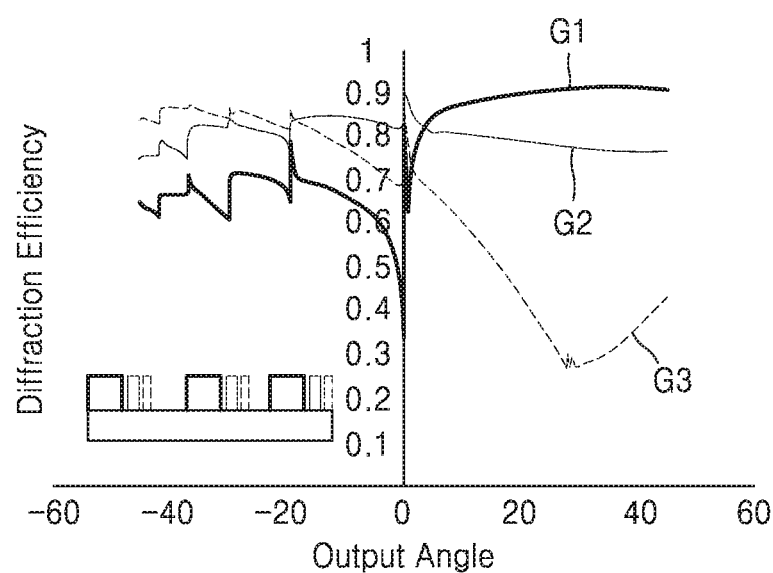

FIG. 10 shows a diffraction efficiency in the case when the diffraction element includes the main diffraction element and two auxiliary diffraction elements.

Referring to FIG. 10, a first graph G1 shows a diffraction efficiency of the diffraction element that includes only the main diffraction element. A second graph G2 shows a diffraction efficiency of the diffraction element that includes the main diffraction element and a single auxiliary diffraction element. A third graph G3 shows a diffraction efficiency of the diffraction element that includes the main diffraction element and two auxiliary diffraction elements.

When the second and third graphs G2 and G3 are compared, it can be seen that as the number of the auxiliary diffraction elements increases, the diffraction efficiency at a positive output angle is reduced. However, at a negative output angle, the diffraction efficiency is increased in the third graph G3, particularly at a relatively large negative output angle. This result indicates that, when the diffraction element that includes the main diffraction element and the auxiliary diffraction elements is used, the diffraction efficiency of negative diffraction light is increased as the number of the auxiliary diffraction elements increases. This trend may is further clarified in the result of FIG. 11.

Figure 11:
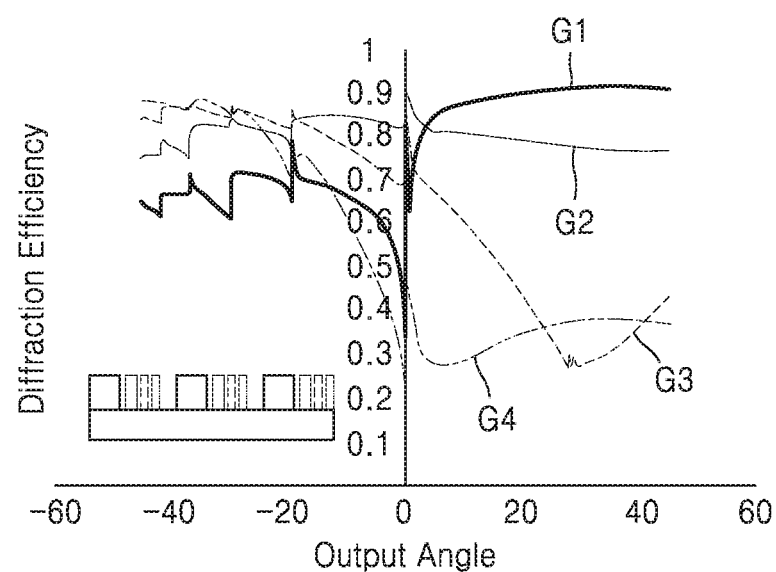

FIG. 11 shows a diffraction efficiency G1 when the diffraction element includes only the main diffraction element, a diffraction efficiency G2 when the diffraction element includes the main diffraction element and a single auxiliary diffraction element, a diffraction efficiency G3 when the diffraction element includes the main diffraction element and two auxiliary diffraction elements, and a diffraction efficiency G4 when the diffraction element includes the main diffraction element and three auxiliary diffraction elements.

When the graphs G1 through G4 of FIG. 11 are compared, at a region having a large negative output angle, the diffraction efficiency sequentially increases from the diffraction element including the single auxiliary diffraction element towards the diffraction element including the three auxiliary diffraction elements. This result indicates that, when a diffraction element that includes the main diffraction element and the auxiliary diffraction element is used, the diffraction efficiency of negative diffraction light is increased as the number of the auxiliary diffraction elements increases, and such phenomenon is clear at a region where a negative output angle is relatively large (for example, a region including −40°).

From the result of FIG. 11, it is seen that a diffraction element including only the main diffraction element may be actively used in increasing the diffraction efficiency of diffraction light having a positive output angle, and a diffraction element including the main diffraction element and some auxiliary diffraction elements may be actively used in increasing the diffraction efficiency of diffraction light having a negative output angle.

Next, various application examples of the diffraction grating device according to an embodiment will be described. The diffraction grating device according to an example embodiment may be applied to various apparatuses besides the examples described below.

Figure 12A:
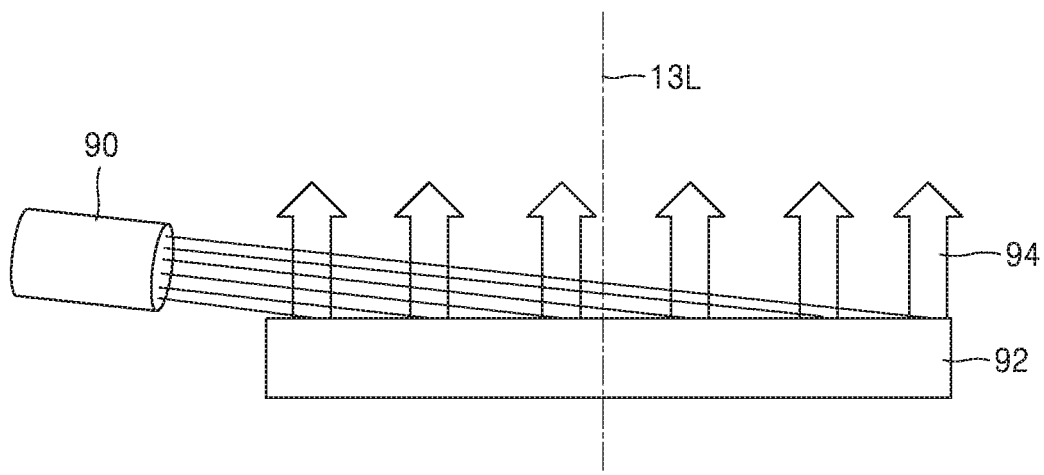
FIGS. 12A through 12C are cross-sectional views showing a case in which a diffraction grating device according to an embodiment is used as a beam expander.
Figure 12B:
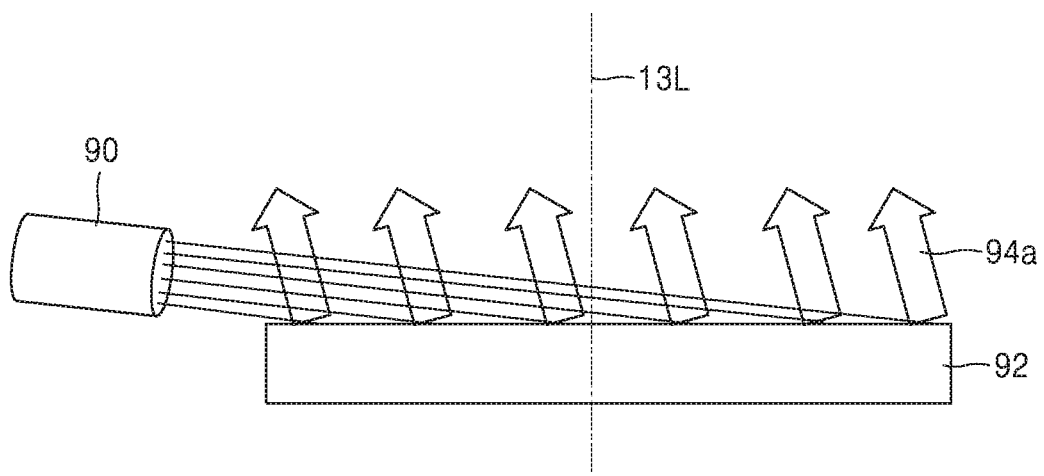
Figure 12C:
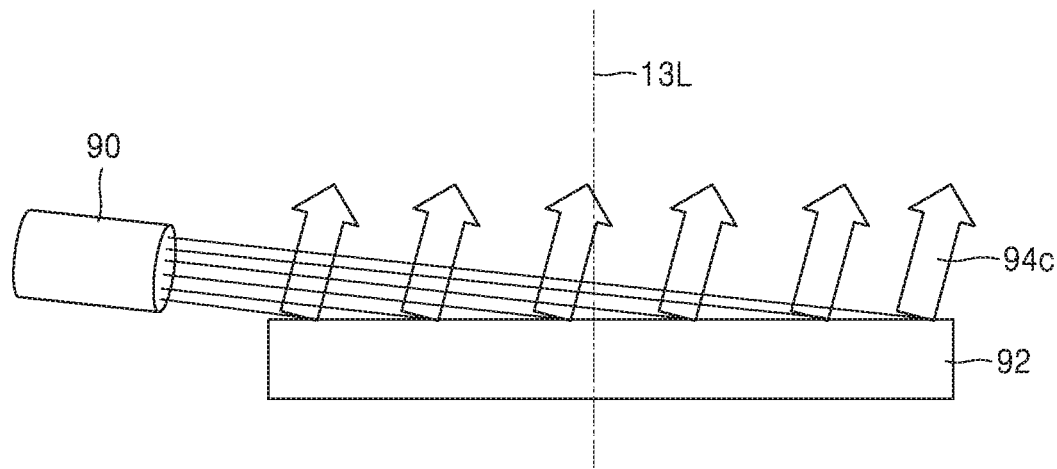

FIGS. 12A through 12C are cross-sectional views showing a case in which a diffraction grating device 92 according to an embodiment is used as a beam expander.

Referring to FIG. 12A, light enters the diffraction grating device 92 from a light source 90. At this point, an incidence angle of light with respect to a reference line 13L may be greater than 45°. An inclination angle of the incident light with respect to the surface of the diffraction grating device 92 may therefore be smaller than 45°. Here, the inclination angle may denote an angle between light emitted from the light source 90 and the upper surface of the diffraction grating device 92. In this way, since the light emitted from the light source 90 enters the upper surface of the diffraction grating device 92 at an inclined angle, a wide surface of the upper surface of the diffraction grating device 92 may be illuminated with a small light emission diameter. In the case when a diameter of the light source 90 is known, it is possible for light emitted from the light source 90 to reach the entire upper surface of the diffraction grating device 92 by controlling an inclination angle between the light emitted from the light source 90, that is, light incident to the diffraction grating device 92 and the upper surface of the diffraction grating device 92. Accordingly, diffraction light may be generated from the entire upper surface of the diffraction grating device 92. All of the diffraction elements arranged on the upper surface of the diffraction grating device 92 have the same diffraction characteristics, as depicted in FIGS. 12A through 12C. Thus, parallel diffraction light rays 94, 94a, and 94c, that is, parallel light rays travelling towards a given direction may be emitted from the entire upper surface of the diffraction grating device 92.

The diffraction grating device 92 may be the diffraction grating device 5 of FIG. 1. At this point, the diffraction elements 20 may have the same diffraction characteristic. As an example, when the diffraction elements 20 have a positive diffraction characteristic and generate diffraction light having an output angle of 0° with respect to the reference line 13L, light incident to the upper surface of the diffraction grating device 92 may be diffracted by the diffraction elements 20. As a result, as depicted in FIG. 12A, parallel diffraction light travelling in a direction perpendicular to the upper surface of the diffraction grating device 92 may be generated. That is, light parallel to the reference light 13L may be generated on the entire upper surface of the diffraction grating device 92.

When the diffraction elements 20 have a positive diffraction characteristic and are diffraction elements that generate diffraction light having a positive output angle greater than 0°, the light incident to the upper surface of the diffraction grating device 92 is diffracted by the diffraction elements 20. As a result, as depicted in FIG. 12B, parallel diffraction light 94a travelling on a left side of the reference line 13L, that is, having a positive output angle is generated. In other words, parallel light 94a that travels on a left side of the reference line 13L and has the same angle with respect to the reference line 13L is generated from the entire upper surface of the diffraction grating device 92.

When the diffraction elements 20 have a negative diffraction characteristic and are diffraction elements (main diffraction element+auxiliary diffraction element) that generate diffraction light having a negative output angle, the light incident to the upper surface of the diffraction grating device 92 is diffracted by the diffraction elements 20. As a result, as depicted in FIG. 12C, parallel diffraction light 94c travelling on a right side of the reference line 13L, that is, having a negative output angle is generated. In other words, parallel light 94a that travels on a right side of the reference line 13L and has the same angle with respect to the reference line 13L is generated from the entire upper surface of the diffraction grating device 92.

In the case of the beam expanders described above, incident light slantingly enters the diffraction grating device 92 with an incidence angle greater than 45°, for example, greater than 80°, and thus, an entire volume of an apparatus may be reduced and the apparatus may be miniaturized.

Figure 13:
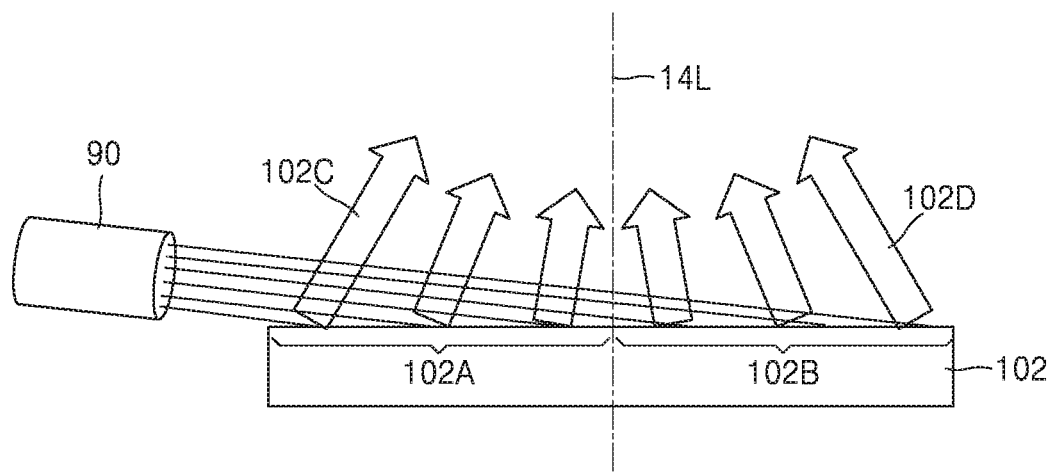
FIG. 13 is a cross-sectional views showing a case in which a diffraction grating device according to an example embodiment is used as a lens.

FIG. 13 is a cross-sectional view showing a case in which a diffraction grating device 102 according to an embodiment is used as a lens. In FIG. 13, the diffraction grating device 102 has been described above, and thus, a detailed configuration of the diffraction grating device 102 will be omitted.

Referring to FIG. 13, the diffraction grating device 102 may include diffraction elements having diffraction characteristics different from one another as described above on an upper surface thereof. The diffraction elements may include the diffraction elements having a positive diffraction characteristic and the diffraction elements having a negative diffraction characteristic described with reference to FIGS. 1 through 3 and 7.

As an example, diffraction elements having a negative diffraction characteristic may be arranged on a first region 102A and diffraction elements having a positive diffraction characteristic may be arranged on a second region 102B of the upper surface of the diffraction grating device 102. In the case of the diffraction elements arranged on the first region 102A, all of the diffraction elements have a negative diffraction characteristic. However, in order for the diffraction grating device 102 to show a lens characteristic, the diffraction elements may be arranged to have different output angles from one another. For this purpose, pitches of the diffraction elements arranged in the first region 102A may be different from one another. For example, the pitches of the diffraction elements may be gradually reduced or increased away from an edge towards the center. Here, the pitches denote pitches between the main diffraction elements.

Diffraction characteristics of the diffraction elements arranged on the second region 102B may be different from the diffraction characteristics of the diffraction elements arranged on the first region 102A. The diffraction characteristics of the diffraction elements arranged on the second region 102B may be opposite to those of the diffraction elements arranged on the first region 102A. All of the diffraction elements arranged on the second region 102B include diffraction elements having a positive diffraction characteristic. Even though all of the diffraction elements arranged on the second region 102B have a positive diffraction characteristic, the pitches between the diffraction elements may be different from one another. For example, in the case of the diffraction elements arranged on the second region 102B, the pitches between the diffraction elements may be gradually reduced or increased away from an edge towards the center of the diffraction grating device 102. A center diffraction element that vertically diffracts incident light (i.e., at an output angle of 0°) may be arranged on the center of the upper surface of the diffraction grating device 102. The center diffraction element may have a positive diffraction characteristic. As an example, a diffraction element arranged on the center of the upper surface of the diffraction grating device 102 of the diffraction elements arranged on the second region 102B or a diffraction element arranged nearest to the first region 102A may function as the center diffraction element.

Light incident to the first region 102A of the diffraction grating device 102 from the light source 90 is diffracted, and thus, is changed to light having a negative output angle, that is, light travelling towards the right side of a reference line 14L. As described above, the diffraction elements on the first region 102A may be arranged so that pitches are gradually increasing or decreasing from an edge towards the center of the diffraction grating device 102. In the case of FIG. 13, the pitches of the diffraction elements of the first region 102A are set so that output angles of diffracted light 102C are reduced from the edge to the center of the diffraction grating device 102. Therefore, negative output angles of light diffracted in the first region 102A may also be gradually reduced from the edge towards the center of the diffraction grating device 102. As a result, the diffracted light 102C generated in the first region 102A may travel to a point on the reference line 14L.

On the other hand, light incident to the second region 102B of the diffraction grating device 102 from the light source 90 is diffracted, and thus, is changed to light having a positive output angle, that is, light travelling towards the left side of the reference line 14L. In a manner similar to the diffraction elements arranged in the first region 102A, pitches of the diffraction elements arranged in the second region 102B are gradually increased or reduced from an edge towards the center of the diffraction grating device 102. In the case of FIG. 13, the pitches of the diffraction elements of the second region 102B are set so that output angles of diffracted light 102D are reduced from the edge towards the center of the diffraction grating device 102. Therefore, positive output angles of light diffracted in the second region 102B may also be gradually reduced from the edge towards the center of the diffraction grating device 102. As a result, the diffracted light 102D generated in the second region 102B may travel to a point on the reference line 14L.

As a result, the diffraction grating device 102 performs a function of diffracting light incident from the light source 90 and collecting the light to a point. That is, the diffraction grating device 102 performs the same function as a convex lens or a concave mirror.

In The diffraction elements arranged in the first region 102A and the diffraction elements arranged in the second region 102B may have diffraction characteristics different from one another. For example, the diffraction elements arranged in the first region 102A may have a positive diffraction characteristic and the diffraction elements arranged in the second region 102B may have a negative diffraction characteristic. In this case, the diffraction grating device 102 may function as an optical element that diverges light incident from the light source 90.

In this way, the diffraction grating device according to an embodiment may be used as various optical elements, and thus, may be applied to various optical apparatuses, for example, an AR apparatus, a VR apparatus, a light field display diffraction optical element, etc.

Figure 14:
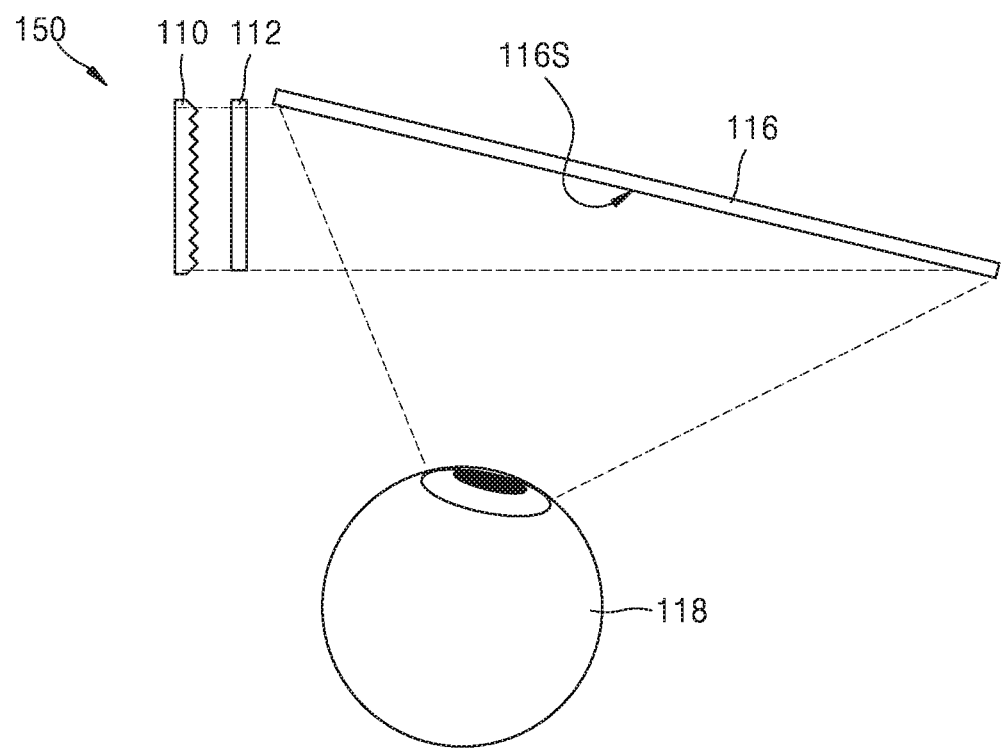
FIG. 14 is a cross-sectional views showing a case in which a diffraction grating device according to an example embodiment is used as one of components of a display device.

FIG. 14 is a cross-sectional view showing a case in which a diffraction grating device according to an embodiment is used as one of components of a display device 150.

Referring to FIG. 14, the display device 150 includes a light source 110, a spatial light modulator (SLM) 112, and a diffraction optical element 116. The light source 110 may emit parallel light. The light source 110 may include a device configured to provide an image. The SLM 112 is arranged between the light source 110 and the diffraction optical element 116. The SLM 112 modulates the intensity and phase of light or an image incident from the light source 110 according to a given signal and transmits a modulated result to the diffraction optical element 116. The diffraction optical element 116 provides the light or the image incident from the SLM 112 to a viewer 118. The diffraction optical element 116 may be one of the diffraction grating devices according to embodiments described above, and may function as a lens. The diffraction optical element 116 may include a plurality of diffraction elements on a surface 116S of the diffraction optical element 116 to which light enters from the SLM 112. The diffraction elements may be arranged to function as a lens as described with reference to FIG. 13, for example.

Figure 15:
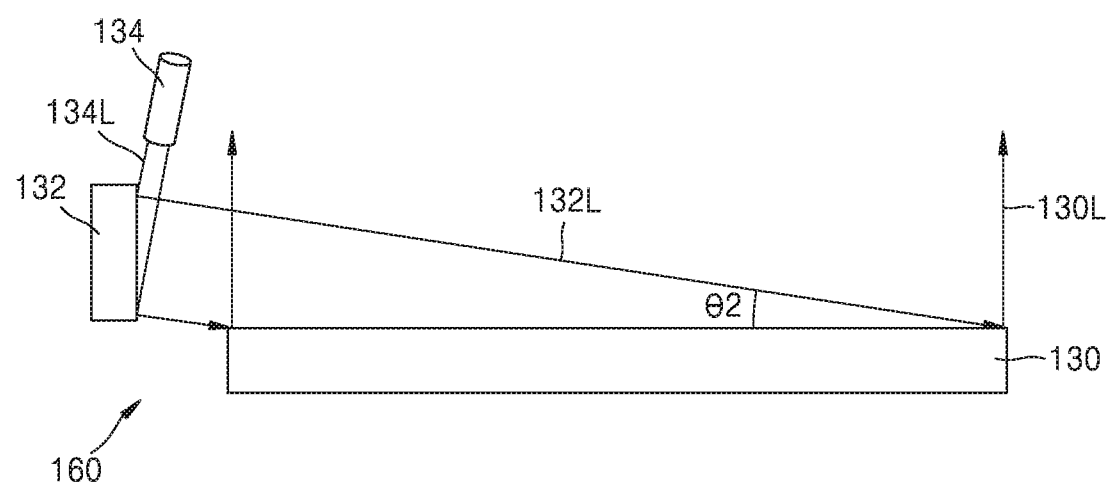
FIG. 15 is a cross-sectional views of an optical apparatus including a diffraction grating device according to an example embodiment.

FIG. 15 is a cross-sectional view of an optical apparatus 160 including a diffraction grating device according to an embodiment. Diffraction grating devices of FIG. 15 may correspond to the diffraction grating devices described above, and thus, the diffraction elements arranged on a surface of the diffraction grating device are not depicted.

Referring to FIG. 15, the optical apparatus 160 including a diffraction grating device according to an embodiment includes a first diffraction grating device 130, a second diffraction grating device 132, and a light source 134. The light source 134 may be a light source configured to emit parallel light, for example, a laser or a light source including a light emitting diode. The second diffraction grating device 132 is arranged between the light source 134 and the first diffraction grating device 130. The arrangement relationship between the light source 134 and the second diffraction grating device 132 may comply with the arrangement relationship between a single light source of any one of the diffraction grating devices according to the embodiments described above, for example, the arrangement relationship between the light source 90 depicted in any one of FIGS. 12A through 12C and the diffraction grating device 92.

Accordingly, light 134L emitted from the light source 134 slantingly enters with an inclination angle less than 45° with respect to a light incident surface of the second diffraction grating device 132. The second diffraction grating device 132 diffracts the light incident from the light source 134 and transmits the diffracted light to the first diffraction grating device 130. The diffraction characteristics of the first and second diffraction grating devices 130 and 132 may be equal to or different from one another. As an example, the first and second diffraction grating devices 130 and 132 may be diffraction grating devices that generate parallel diffraction light as in the case of a beam expander shown, for example, in FIGS. 12A through 12C. As another example, the second diffraction grating device 132 may be a diffraction grating device that generates parallel diffraction light like a beam expander, and the first diffraction grating device 130 may be a diffraction grating device that generates parallel diffraction light or non-parallel diffraction light. Here, the non-parallel diffraction light may include light that converges to a given point or light that diverges after diffraction. The first diffraction grating device 130 may be a diffraction grating device (for example, one of the diffraction grating devices of FIGS. 12A through 12C) that functions as a beam expander described above or a diffraction grating device (for example, the diffraction grating device of FIG. 13) that functions as a lens described above. The second diffraction grating device 132 may be a diffraction grating device that functions as a beam expander described above. The second diffraction grating device 132 may provide parallel light to the first diffraction grating device 130 as incident light. The second diffraction grating device 132 may therefore function as a light source with respect to the first diffraction grating device 130. Accordingly, a combination of the light source 134 and the second diffraction grating device 132 may be regarded as a light source device or a light source unit that provides incident light to the first diffraction grating device 130. This arrangement in which two or more diffraction grating devices are used may be applied to other embodiments.

As shown in FIG. 15, the light 134L incident to the second diffraction grating device 132 from the light source 134 is diffracted by the second diffraction grating device 132. The second diffraction grating device 132 may function as a beam expander. Accordingly, parallel diffraction light 132L is generated from the second diffraction grating device 132. The parallel diffraction light 132L generated from the second diffraction grating device 132 enters an upper surface of the first diffraction grating device 130 at an inclined angle. At this point, an inclination angle 82 of the diffraction light 132L may be less than 45°, for example, less than 30°. The arrangement relationship between the second diffraction grating device 132 and the first diffraction grating device 130 may comply with the arrangement relationship between the light source 90 and the diffraction grating device 92 depicted in FIGS. 12A through 12C. When the first diffraction grating device 130 is a beam expander, as depicted in FIG. 15, the diffraction light 132L incident to the first diffraction grating device 130 is diffracted in a direction perpendicular to the upper surface of the first diffraction grating device 130 and a diffracted light 130L is transmitted as parallel light.

Although the light 134L emitted from the light source 134 is mono-color light, the light 134L emitted from the light source 134 may not be completely mono-color light. That is, the light source 134 may be a light source configured to emit light of a single wavelength, but it may be practically difficult to completely emit only light of a single wavelength. Thus, the light 134L emitted from the light source 134 may include the single wavelength as the main wavelength and may additionally include wavelengths (hereinafter, noise wavelengths) near to the main wavelength. At this point, the intensity of light of the noise wavelength is negligibly small when compared to that of the main wavelength. However, light corresponding to the noise wavelength may also be diffracted together with the light 134L emitted from the light source 134 in a process of diffracting the light 134L by the second diffraction grating device 132. Accordingly, a chromatic dispersion may occur to the diffraction light 132L generated from the second diffraction grating device 132. The diffraction light 132L may include main diffraction light by the diffraction of light corresponding to the main wavelength together with noise diffraction light by the diffraction of light corresponding to the noise wavelengths that has a travelling direction and color different from the main diffraction light. The effect of the noise diffraction light may not appear or may be insignificant in a short distance beam expansion process or a short distance beam focusing process. However, the effect of the noise diffraction light may appear in a long distance beam expansion process or a long distance beam focusing process. This undesirable noise diffraction light may be removed by re-diffracting the diffraction light 132L using the first diffraction grating device 130. For this purpose, pitches of the diffraction elements included in the first diffraction grating device 130 may be equal to that of the diffraction elements included in the second diffraction grating device 132. The diffracted light 130L generated from the first diffraction grating device 130 does not include the noise diffraction light.

Figure 16:
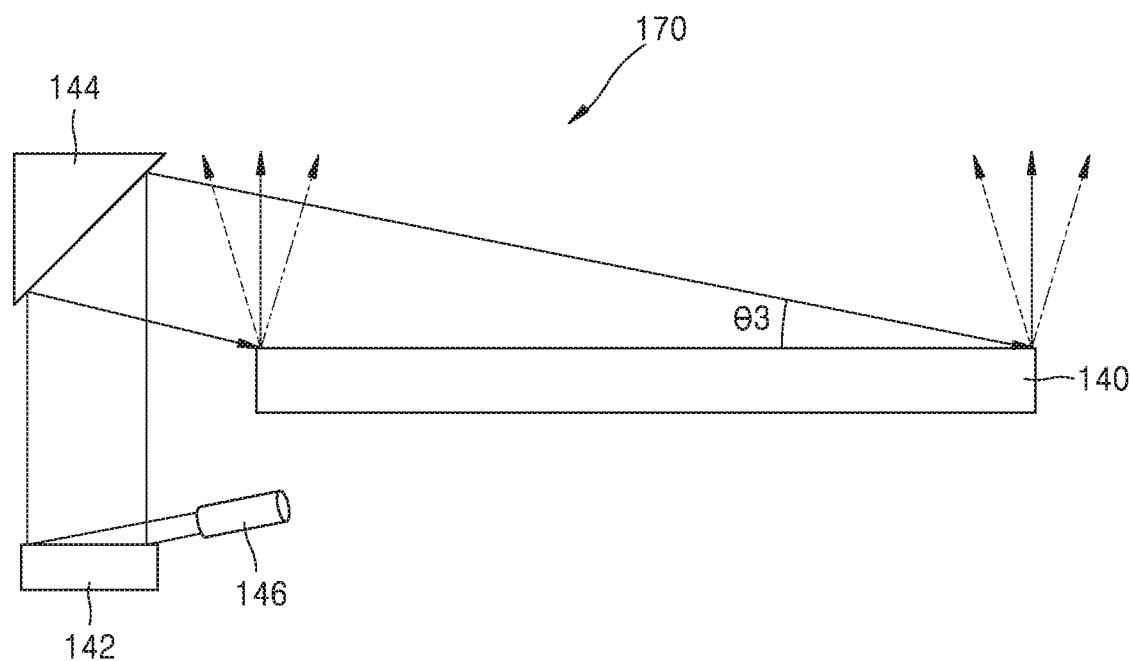
FIG. 16 is a cross-sectional views of another optical apparatus including a diffraction grating device according to an example embodiment.

FIG. 16 is a cross-sectional view of an optical apparatus 170 including a diffraction grating device according to an embodiment. Diffraction grating devices depicted in FIG. 16 correspond to any one of the diffraction grating devices described above. Accordingly, for convenience of explanation, diffraction elements arranged on a light incident surface are not depicted.

Referring to FIG. 16, the optical apparatus 170 includes a light source 146, a first diffraction grating device 140, a second diffraction grating device 142, and a reflector 144. The second diffraction grating device 142 is arranged between the light source 146 and the reflector 144 on an optical path from the light source 146 to the first diffraction grating device 140. The reflector 144 is arranged between the first diffraction grating device 140 and the second diffraction grating device 142. The light source 146 provides incident light to the second diffraction grating device 142. The configuration and function of the light source 146 may be the same as those of the light source 134 of FIG. 15. Accordingly, the light source 134 of FIG. 15 may be used as the light source 146. The first diffraction grating device 140 and the second diffraction grating device 142 may be any one of the diffraction grating devices described above. For example, the first diffraction grating device 140 may be a diffraction grating device that functions as a beam expander (as shown, for example, in FIGS. 12A through 12C) or a lens (as shown, for example, in FIG. 13). The second diffraction grating device 142 may be a diffraction grating device that diffracts light incident from the light source 146 and provides diffracted light to the reflector 144. The second diffraction grating device 142 may be a diffraction grating device that functions as a beam expander. The arrangement relationship between the light source 146 and the second diffraction grating device 142 may be similar to the arrangement relationship between the light source 134 and the second diffraction grating device 132 of FIG. 15. The reflector 144 reflects light incident from the second diffraction grating device 142 to a diffraction surface (for example, an upper surface) of the first diffraction grating device 140 through a surface thereof. That is, the reflector 144 may be one of light transmission elements that transmit diffraction light of the second diffraction grating device 142 to the first diffraction grating device 140. The reflector 144 may be a prism or a reflection device including a prism. Other reflection devices besides a prism, such as a mirror, may be used as the reflector 144. The reflector 144 allows light incident from the second diffraction grating device 142 to slantingly enter a diffraction surface of the first diffraction grating device 140 at a given inclination angle 83 by reflecting the light incident from the second diffraction grating device 142. The inclination angle 83 may be less than 45°, as an example, less than 30°. The arrangement relationship between the reflector 144 and the first diffraction grating device 140 in consideration of an incidence angle of light incident to the first diffraction grating device 140 may be similar to the arrangement relationship between the first diffraction grating device 130 and the second diffraction grating device 132 of FIG. 15. That is, the reflector 144 may be arranged so that light incident conditions with respect to the first diffraction grating device 140 are maintained between the first diffraction grating device 140 and the second diffraction grating device 142.

Diffraction light generated from the second diffraction grating device 142 is parallel light. Accordingly, light incident to the first diffraction grating device 140 from the reflector 144 is also parallel light. Light reflected by the reflector 144 may simultaneously be incident to an entire diffraction surface of the first diffraction grating device 140. When the first diffraction grating device 140 functions as a beam expander, diffraction light (solid line) generated from the first diffraction grating device 140, as depicted in FIG. 16, may be parallel light. Dashed line arrows indicate travelling directions of parallel diffraction light when all diffraction elements formed on the diffraction surface of the first diffraction grating device 140 have a positive diffraction characteristic (left arrows) or a negative diffraction characteristic (right arrows).

Figure 17:
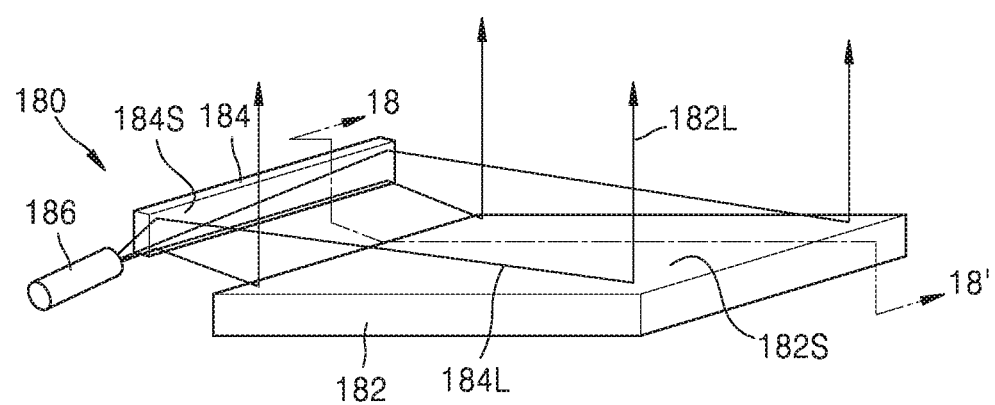
FIG. 17 is a cross-sectional views of another optical apparatus including a diffraction grating device according to an example embodiment.

FIG. 17 is a cross-sectional view of an optical apparatus 180 including a diffraction grating device according to an embodiment.

Referring to FIG. 17, the optical apparatus 180 includes a light source 186, a first diffraction grating device 182, and a second diffraction grating device 184. The second diffraction grating device 184 is arranged between the light source 186 and the first diffraction grating device 182 on an optical path starting from the light source 186. The light source 186 may be a light source configured to emit parallel light. As an example, the light source 186 may be a light source that emits a laser or a light source including a light emitting diode (LED). The first diffraction grating device 182 and the second diffraction grating device 184 may each be any one of the diffraction grating devices according to embodiments described above. The second diffraction grating device 184 may function as a beam expander, as depicted in FIGS. 12A through 12C, that generates light parallel to an entire incident surface to which light enters. The first diffraction grating device 182 and the second diffraction grating device 184 may generate converging light that is collected on a given point in front of the first diffraction grating device 182. In this case, the first diffraction grating device 182 may function as a lens as shown, for example, in FIG. 13. The second diffraction grating device 184 diffracts light incident from the light source 186 and provides incident light 184L to the first diffraction grating device 182. The incident light 184L may be parallel light. The second diffraction grating device 184 may be, for example, the diffraction grating device depicted in FIG. 12A.

The light source 186, the first diffraction grating device 182, and the second diffraction grating device 184 may be arranged in consideration of an incidence angle of incident light.

In detail, the light source 186 and the second diffraction grating device 184 may be arranged so that light emitted from the light source 186 is incident to the first diffraction grating device 182 with a given incidence angle. At this point, the incidence angle is measured based on a reference line (vertical line 184V of FIG. 18) which is perpendicular to a diffraction surface 184S of the second diffraction grating device 184. An incidence angle of light emitted from the light source 186 entering the diffraction surface 184S of the second diffraction grating device 184 may be greater than 45°, and as an example, greater than 75°. When an incidence angle is measured with reference to the diffraction surface 184S, the incidence angle may be less than 45°, and as an example, less than 30°.

The diffraction surface 184S of the second diffraction grating device 184 may be a rectangle. The light source 186 may be flush with the second diffraction grating device 184. The light source 186 is arranged on a side of the second diffraction grating device 184, and thus, may irradiate light to the diffraction surface 184S in a length direction of the second diffraction grating device 184. The diffraction light 184L generated from the diffraction surface 184S of the second diffraction grating device 184 is parallel light vertically emitted with respect to the diffraction surface 184S. The diffraction light 184L generated from the diffraction surface 184S of the second diffraction grating device 184 enters an entire region of a diffraction surface (an upper surface) 182S of the first diffraction grating device 182.

Figure 18:
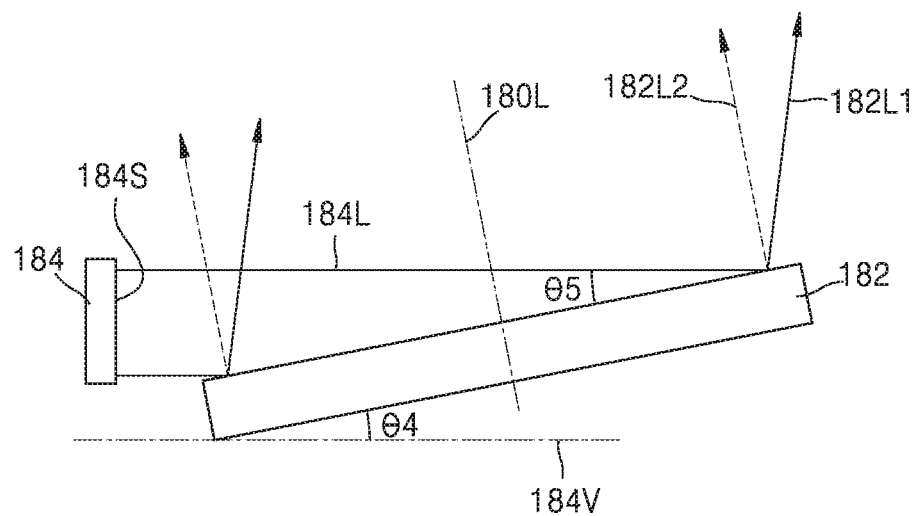
FIGS. 18 and 19 are cross-sectional views taken along line 18-18' of FIG. 17.
Figure 19:
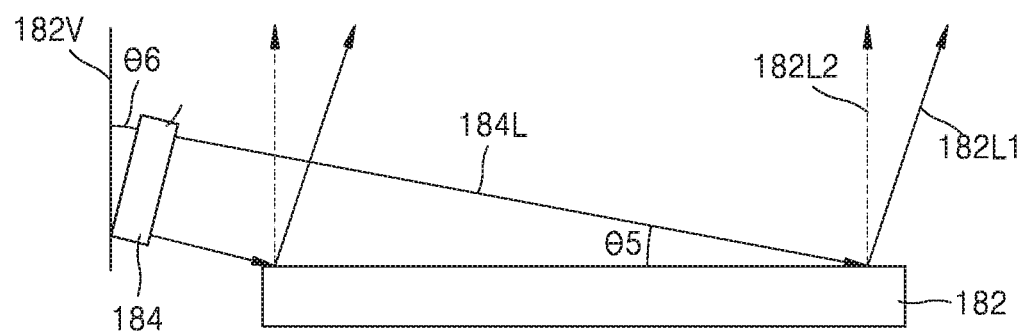

In this situation, a light incidence angle relationship between the light source 186 and the second diffraction grating device 184 may also be applied between the first diffraction grating device 182 and the second diffraction grating device 184. The first diffraction grating device 182 and the second diffraction grating device 184 may therefore be arranged as depicted in FIGS. 18 and 19. However, the arrangement of the first diffraction grating device 182 and the second diffraction grating device 184 is not limited thereto.

FIGS. 18 and 19 are cross-sectional views taken along line 18-18' of FIG. 17.

Referring to FIG. 18, the second diffraction grating device 184 is vertically arranged, and the first diffraction grating device 182 is slantingly arranged with respect to the second diffraction grating device 184. The first diffraction grating device 182 is arranged to have a given angle θ4 with respect to a reference line (a normal line) 184V perpendicular to the diffraction surface 184S of the second diffraction grating device 184. The given angle θ4 may be less than 45°, as an example, less than 30°, and as another example, less than 15°. Parallel diffraction light 184L that is perpendicular to the diffraction surface 184S is emitted from the diffraction surface 184S of the second diffraction grating device 184. As described above, the first diffraction grating device 182 is inclined with a given angle θ4 (inclination angle θ4) with respect to the second diffraction grating device 184, and a travelling direction of the diffraction light 184L emitted from the second diffraction grating device 184 is perpendicular to the diffraction surface 184S of the second diffraction grating device 184. Accordingly, when an incidence angle θ5 of the diffraction light 184L emitted from the diffraction surface 184S of the second diffraction grating device 184 enters the first diffraction grating device 182, the incidence angle θ5 is equal to the inclination angle θ4. The inclination angle θ4 and the incidence angle θ5 may be similar to an incidence angle condition when light emitted from the light source 186 enters the second diffraction grating device 184.

According to diffraction characteristics of diffraction elements arranged on the diffraction surface 182S of the first diffraction grating device 182, diffraction light 182L2 parallel to a reference line 180L which is vertical (i.e., normal) to the diffraction surface 182S of the first diffraction grating device 182 may be emitted, or diffraction light 182L1 travelling on a right side of the reference line 180L may be emitted. Also, although not shown, diffraction light traveling on a left side direction of the reference line 180L may be emitted, or diffraction light converging on a point located in front of the first diffraction grating device 182 may be emitted.

FIG. 19 shows a case opposite to the case of FIG. 18. That is, the first diffraction grating device 182 is horizontally arranged, and the second diffraction grating device 184 is slantingly arranged with respect to the first diffraction grating device 182. In detail. The second diffraction grating device 184 is slantingly arranged at a given angle 86 (an inclination angle 86) with respect to a reference line (a normal line) 182V which is perpendicular to an upper surface of the first diffraction grating device 182. The inclination angle 86 may be equal to the inclination angle θ4 of the first diffraction grating device 182 of FIG. 18. The diffraction light 184L emitted from the second diffraction grating device 184 is perpendicular to the diffraction surface 184S of the second diffraction grating device 184, and thus, the incidence angle of the diffraction light 184L incident to the first diffraction grating device 182 and the diffraction result from the first diffraction grating device 182 according to the incidence of the diffraction light 184L may be the same as those described with reference to FIG. 18.

Next, a method of manufacturing a diffraction grating device according to an embodiment will be described with reference to FIGS. 20 through 29.

FIGS. 20 through 24 are cross-sectional views showing a process of manufacturing a template that is used to imprint a diffraction grating in a method of manufacturing a diffraction grating device according to an embodiment.

Figure 20:
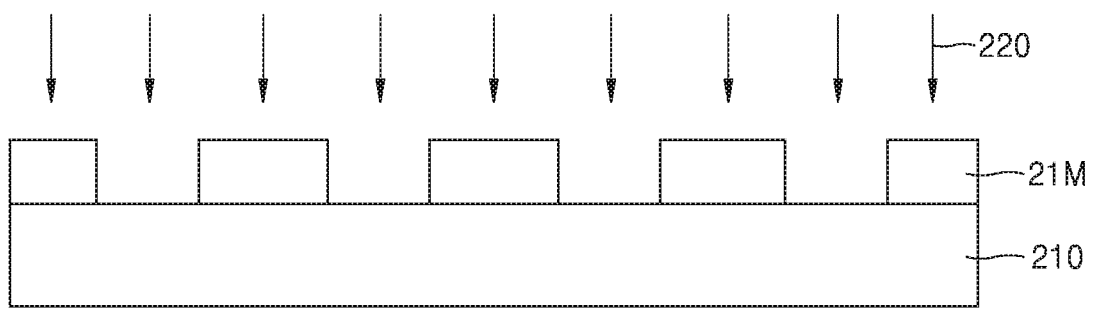
FIGS. 20 through 24 are cross-sectional views showing a process of manufacturing a template that is used to imprint a diffraction grating in a method of manufacturing a diffraction grating device according to an example embodiment.

Referring to FIG. 20, a plurality of mask patterns 21M are formed on a parent substrate 210 to be processed as a template. The mask patterns 21M are separated from each other. Accordingly, an upper surface of the parent substrate 210 between the mask patterns 21M is exposed. Gaps between the mask patterns 21M or sizes of the mask patterns 21M may be set in consideration of desired pitches of diffraction elements of the diffraction grating device to be finally formed. After the mask patterns 21M are formed, exposed regions of the upper surface of the parent substrate 210 are etched by using an electron beam lithography device 220. The etching of the parent substrate 210 may be stopped before reaching a bottom of the parent substrate 210.

Figure 21:
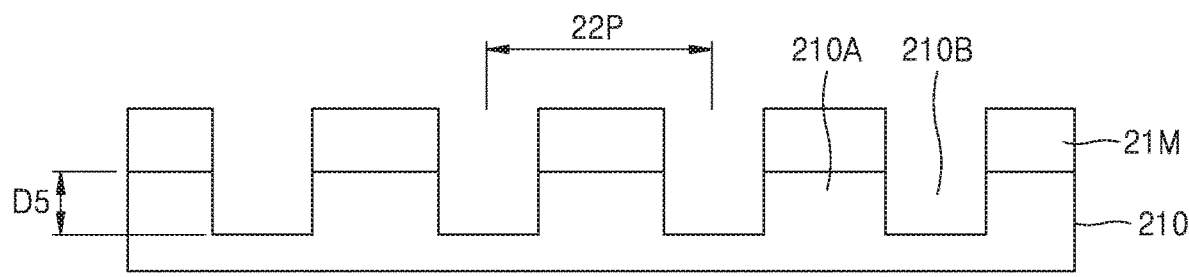

As depicted in FIG. 21, as a result of the etching, a plurality of protrusions 210A and a plurality of grooves 210B are formed. The grooves 210B are separated from each other, and the protrusions 210A are present between the grooves 210B. The grooves 210B may be formed with a given pitch 22P. Accordingly, diffraction elements of the diffraction grating device to be finally formed may have the same pitch 22P. A depth D5 of the grooves 210B may correspond to a desired height of the diffraction elements to be finally formed.

Figure 22:
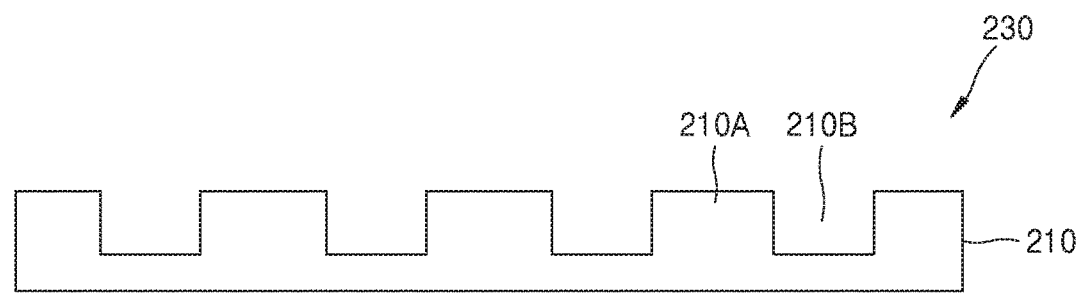

After the etching, the mask patterns 21M are removed as shown in FIG. 22 to complete a template 230.

Figure 23:
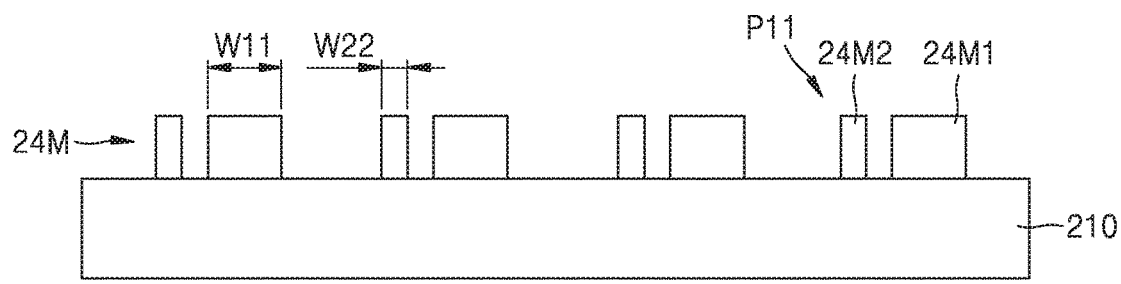
Figure 24:
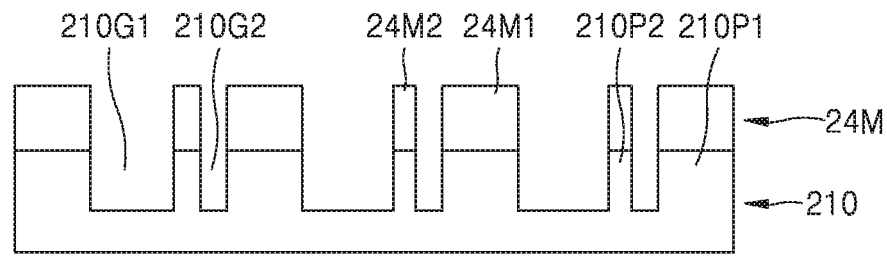

FIGS. 23 and 24 show a method of manufacturing another template in the method of manufacturing a diffraction grating device according to an embodiment.

Referring to FIG. 23, a mask 24M that covers a portion of the parent substrate 210 and exposes remaining portions of the parent substrate 210 is formed on the parent substrate 210. The mask 24M may be formed on an upper surface of the parent substrate 210. The mask 24M includes a plurality of unit patterns P11 that are separated from each other. Each of the unit patterns P11 may include a main pattern 24M1 and an auxiliary pattern 24M2. The main pattern 24M1 has a width greater than that of the auxiliary pattern 24M2. The main pattern 24M1 and the auxiliary pattern 24M2 are separated from each other. A gap between the main pattern 24M1 and the auxiliary pattern 24M2 is less than a gap between the unit patterns P11. A width W11 of the main pattern 24M1 may determine a gap between diffraction elements including auxiliary diffraction elements of the diffraction grating device to be finally formed. Also, a width W22 of the auxiliary pattern 24M2 may determine a gap between the main diffraction elements and the auxiliary diffraction elements in the diffraction elements including auxiliary diffraction elements of the diffraction grating device to be finally formed.

After the mask 24M is formed, the exposed portion of the upper surface of the parent substrate 210 is etched. The etching may be performed by using an electron beam etching method. The etching may be continued until grooves having a set depth are formed. The depth is less than a thickness of the parent substrate 210. As a result of the etching, as depicted in FIG. 24, a plurality of first and second grooves 210G1 and 210G2 and a plurality of protrusions 210P1 and 210P2 are formed. The protrusions 210P1 and 210P2 are regions of the parent substrate 210 below the main mask 24M1 and the auxiliary mask 24M2, respectively, of the mask 24M. Among the first and second grooves 210G1 and 210G2, the first groove 210G1 determines dimensions (width, height, etc.) of the main diffraction elements to be finally formed. The second groove 210G2 that is adjacent to the first groove 210G1 and has a width less than that of the first groove 210G1 determines dimensions (width, height, etc.) of the auxiliary diffraction elements to be finally formed. A pitch between the first grooves 210G1 determines a pitch of the diffraction elements including the auxiliary diffraction elements of the diffraction grating device to be finally formed. When the mask 24M of FIG. 23 is formed, the dimensions of the main pattern 24M1 and the auxiliary pattern 24M2 may be determined in consideration of the above factors.

FIGS. 25 through 29 are cross-sectional views showing a method of manufacturing a diffraction grating device according to an embodiment by using the template 230 manufactured in operations described with reference to FIGS. 20 through 24.

Figure 25:
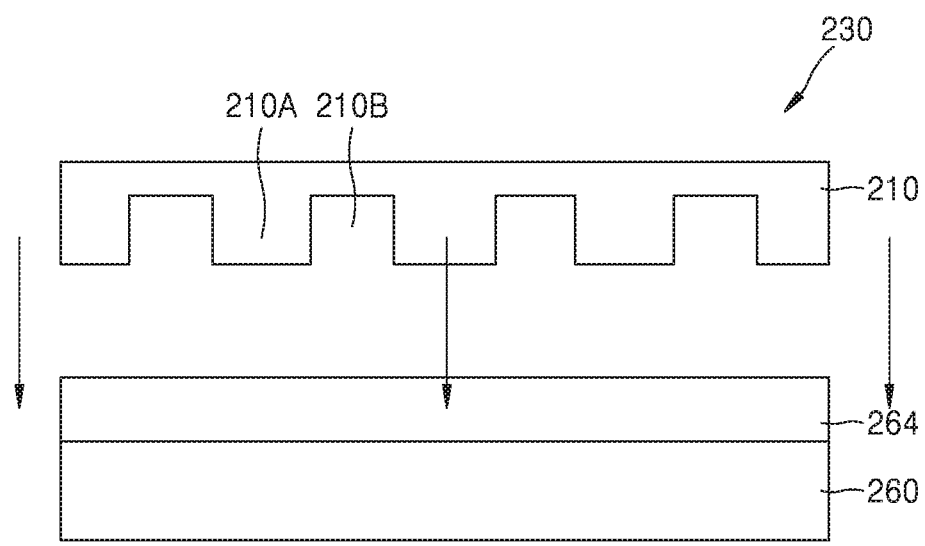
FIGS. 25 through 29 are cross-sectional views showing a method of manufacturing a diffraction grating device according to an example embodiment by using a template manufactured in operations described with reference to FIGS. 20 through 24.
Figure 26:
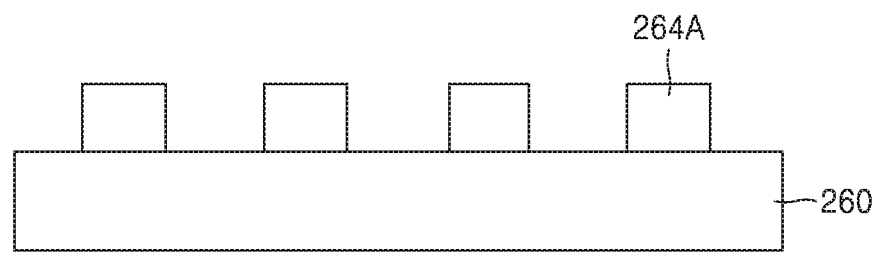

Referring to FIG. 25, a dielectric layer 264 having a low refractive index is formed on a substrate 260. The substrate 260 may include the same material as the material included in the substrate 10 described with reference to FIG. 1. The dielectric layer 264 is a material layer used to form the diffraction elements. The dielectric layer 264 may be the same material used as the diffraction elements 20 described with reference to FIG. 1. The template 230 of FIG. 22 is arranged on the dielectric layer 264. The template 230 is aligned so that a surface of the template 230 on which the protrusions 210A and the grooves 210B are formed faces an entire upper surface of the dielectric layer 264. When the alignment of the template 230 is completed, the aligned template 230 is pressed down onto the dielectric layer 264 to take an imprint like a stamping. After imprinting the template 230, the template 230 is separated from the dielectric layer 264. Accordingly, a pattern formed on the other surface of the template 230, that is, a pattern including the protrusions 210A and the grooves 210B is transferred onto the dielectric layer 264. As a result, as depicted in FIG. 26, a plurality of dielectric layer patterns 264A separated from each other are formed on the substrate 260. The dielectric layer patterns 264A are used as diffraction elements corresponding to the diffraction elements 20 of FIG. 1. In this imprinting process, a residue material layer (for example, reference numeral 52 of FIG. 5 or reference numeral 62 of FIG. 6) of the dielectric layer 264 between the dielectric layer patterns 264A may remain on the substrate 260, but a thickness of the residue material layer may not exceed 30 nm.

A process of FIGS. 25 and 26 may be equally applied to a case of forming a diffraction grating device having diffraction elements of a different pattern by changing the pattern formed on the other surface of the template 230. As an example, this case is shown in FIGS. 27 and 28.

Descriptions of parts made with reference to FIGS. 25 and 26 are omitted.

Figure 27:
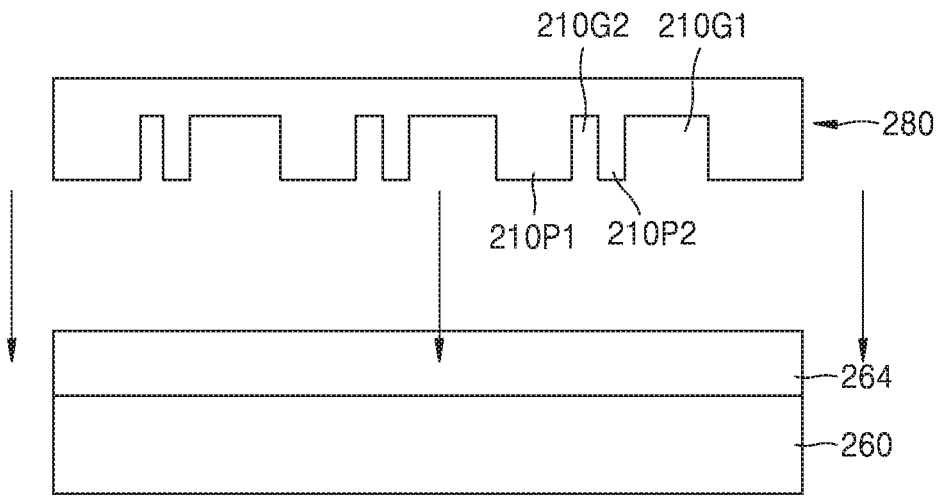
Figure 28:
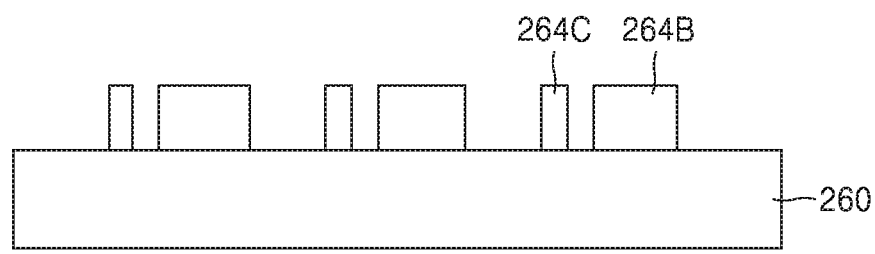

Referring to FIG. 27, a template 280 formed in FIG. 24 is aligned on the dielectric layer 264. The template 280 is aligned so that the protrusions 210P1 and 210P2 and the first and second grooves 210G1 and 210G2 formed on the other surface of the template 280 face the upper surface of the dielectric layer 264. In the aligned state, after imprinting the template 280 onto the dielectric layer 264 by lowering the template 280 like a stamping, the template 280 is separated from the dielectric layer 264. As a result, a pattern of the protrusions 210P1 and 210P2 and the first and second grooves 210G1 and 210G2 formed on the other surface of the template 280 is transferred to the dielectric layer 264, and thus, as depicted in FIG. 28, a plurality of dielectric layer patterns including a main pattern 264B and an auxiliary pattern 264C are formed as a unit pattern. The main pattern 264B corresponds to the main diffraction elements 30A and the auxiliary pattern 264C corresponds to the diffraction elements 30B described with reference to FIGS. 2 and 3.

Figure 29:
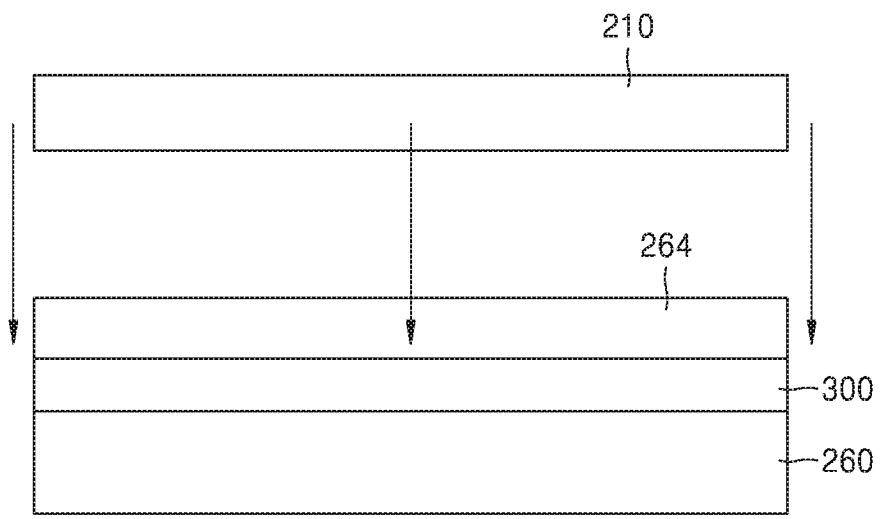

As shown in FIG. 29, a spacer layer 300 may be formed between the substrate 260 and the dielectric layer 264. The spacer layer 300 may have the same layer configuration of the spacer 50 of FIG. 5 or the spacer 60 of FIG. 6. After the dielectric layer 264 is formed, a template 310 is aligned on the dielectric layer 264, and then, as described with reference to FIG. 25 or FIG. 27, an imprinting process for transferring a pattern formed on the other surface of the template 310 to the dielectric layer 264 may be performed. The template 310 may be the template 210 or 280 depicted in FIG. 25 or FIG. 27.

In a diffraction grating device according to an embodiment, diffraction elements have a height that may cause destructive interference in zeroth-order diffraction light with respect to incident light entering the diffraction elements with an incidence angle greater than 75°. Also, with respect to a diffraction element that generates a negative diffraction light, diffraction light of higher orders greater than second-order are removed by appropriately arranging a main diffraction element and one or more auxiliary diffraction elements. Accordingly, a high diffraction efficiency near to 1 may be obtained with respect to first order diffraction light. In the diffraction grating device according to an embodiment, the configurations and dimensions (height, pitch, etc.) of the diffraction elements are optimized with respect to the diffraction of incident light having a high incidence angle close to a horizontal line, and thus, the total volume of the diffraction grating device is very small and thin. Therefore, when the diffraction grating device according to an embodiment is used in another apparatus, the volume of the apparatus may be reduced.

Also, an output angle of diffraction light may be controlled through controlling a pitch of the diffraction elements or the number of auxiliary diffraction elements, and thus, an output angle of a wide range may be ensured. The resultant diffraction grating device according to an embodiment may, for example, contribute to increase in a viewing angle in a display.

Also, in the case of the diffraction grating device according to an embodiment, two diffraction grating devices that are optically combined are used, and thus, a chromatic dispersion that may occur when one diffraction grating device is used may be reduced or removed.

Also, in the diffraction grating device according to an embodiment, the diffraction elements include a material (for example, polymer) having a refractive index less than 2.0. Accordingly, the diffraction grating device according to an embodiment may be formed by using a nano-imprinting method, and thus, a diffraction grating device having a large diameter may be readily manufactured, and a manufacturing cost may also be reduced.

While one or more embodiments have been described with reference to the figures, it will be understood by those of ordinary skill in the art that various changes in form and details may be made therein without departing from the spirit and scope as defined by the following claims.

What is claimed is:

1. A diffraction grating device comprising:
   a light reflection substrate; and
   a diffraction grating arranged on the light reflection substrate,
   wherein the diffraction grating comprises a plurality of diffraction elements, and
   wherein the diffraction grating device further comprises a dielectric layer between the light reflection substrate and the diffraction grating, wherein a thickness of the dielectric layer is an integer multiple of a wavelength of light incident on the diffraction grating.

2. The diffraction grating device of claim 1, wherein the light reflection substrate comprises a Bragg reflector comprising a first dielectric layer and a second dielectric layer having refractive indexes different from one another.

3. The diffraction grating device of claim 1, wherein a refractive index of the diffraction grating is in a range from 1.3 to 2.0.

4. The diffraction grating device of claim 1, wherein each diffraction element from among the plurality of diffraction elements comprises a main diffraction sub-element and a plurality of auxiliary diffraction sub-elements.

5. The diffraction grating device of claim 1, wherein the light reflection substrate comprises a metal substrate.

6. The diffraction grating device of claim 1, wherein the light reflection substrate comprises a reflective wire grid polarizer.

7. The diffraction grating device of claim 1, wherein the dielectric layer is a mono-layer.

8. The diffraction grating device of claim 7, wherein a refractive index of the dielectric layer is equal to or greater than a refractive index of the plurality of diffraction elements.

9. The diffraction grating device of claim 1, wherein the dielectric layer comprises stacked first and second dielectric layers, wherein respective refractive indices of the stacked first and second dielectric layers are different from each other.

10. The diffraction grating device of claim 9, wherein, of the first and second dielectric layers, a refractive index of the dielectric layer that directly contacts the plurality of diffraction elements is greater than a refractive index of the plurality of diffraction elements, and of the first and second dielectric layers, the refractive index of the dielectric layer that directly contacts the plurality of diffraction elements is greater than a refractive index of the other dielectric layer of the first and second dielectric layers.

11. The diffraction grating device of claim 1, wherein each diffraction element from among the plurality of diffraction elements comprises a main diffraction sub-element and an auxiliary diffraction sub-element.

12. The diffraction grating device of claim 11, wherein a width of the main diffraction sub-element is greater than a width of the auxiliary diffraction sub-elements.

13. The diffraction grating device of claim 11, wherein the auxiliary diffraction sub-element comprises a plurality of auxiliary diffraction sub-elements that are separated from one another.

14. The diffraction grating device of claim 1, wherein all diffraction elements from among the plurality of diffraction elements are arranged to direct diffracted light toward a light source that emits light that is incident upon the diffraction grating device, or all diffraction elements from among the plurality of diffraction elements are arranged to direct diffracted light away from the light source that emits the incident light.

15. The diffraction grating device of claim 4, wherein all auxiliary diffraction sub-elements from among the plurality of auxiliary diffraction sub-elements are arranged to direct the diffracted light toward the light source that emits the incident light.

16. The diffraction grating device of claim 4, wherein all auxiliary diffraction sub-elements from among the plurality of auxiliary diffraction sub-elements are arranged to direct the diffracted light away from the light source that emits the incident light.

17. The diffraction grating device of claim 14, wherein pitches between adjacent diffraction elements from among the plurality of diffraction elements are equal to one another.

18. The diffraction grating device of claim 1, wherein a first diffraction element from among the plurality of diffraction elements is arranged to have a positive grating angle and a second diffraction element from among the plurality of diffraction elements is arranged to have a negative grating angle.

19. The diffraction grating device of claim 18, wherein the plurality of diffraction elements comprise diffraction elements having positive grating angles and diffraction elements having negative grating angles.

20. The diffraction grating device of claim 19, wherein the plurality of diffraction elements having positive grating angles are arranged to have different grating angles from one another.

21. The diffraction grating device of claim 20, wherein pitches of the plurality of diffraction elements having the positive grating angles are different from one another.

22. The diffraction grating device of claim 19, wherein the plurality of diffraction elements having negative grating angles are arranged to have different grating angles from one another.

23. The diffraction grating device of claim 22, wherein pitches of the plurality of diffraction elements having the negative grating angles are different from one another.

24. An optical apparatus comprising:
a light source unit; and
a first diffraction grating device configured to diffract light incident from the light source unit, wherein the first diffraction grating device is a diffraction grating device of claim 1.

25. The optical apparatus of claim 24, wherein
the light source unit comprises:
a light source configured to directly emit light;
a second diffraction grating device that diffracts light incident from the light source such that light exits the second diffraction grating device in a first direction; and
a transmission element that transmits the light exiting the second diffraction grating device to the first diffraction grating device.

26. The optical apparatus of claim 25, wherein the light source further comprises a light reflector arranged between the second diffraction grating device and the first diffraction grating device.

27. The optical apparatus of claim 24, wherein
the light source unit comprises:
a light source configured to emit light; and
a second diffraction grating device,
wherein the light emitted by the light source is incident on the second diffraction grating device, and
wherein the second diffraction grating device is configured to provide incident light to the first diffraction grating device by diffracting light incident from the light source.

28. The optical apparatus of claim 27, wherein one of the first and second diffraction grating devices is slantingly arranged at an angle less than 45° with respect to a normal line perpendicular to a diffraction surface of the other one of the first and second diffraction grating devices.

29. The optical apparatus of claim 27, wherein a direction of light diffracted by the first diffraction grating device and a direction of light diffracted by the second diffraction grating device are identical to one another.

30. The optical apparatus of claim 29, wherein the first diffraction grating device comprises a first beam expander and the second diffraction grating device comprises a second beam expander.

31. The optical apparatus of claim 27, wherein a direction of light diffracted by the first diffraction grating device and a direction of light diffracted by the second diffraction grating device have grating angles different from one another.

32. The optical apparatus of claim 31, wherein the first diffraction grating device is configured to focus light incident from the second diffraction grating device, and the second diffraction grating device is configured to expand the light incident from the light source.

* * * * *